United States Patent [19]

Oblizajek

[11] Patent Number: 5,396,438
[45] Date of Patent: Mar. 7, 1995

[54] TIRE MANUFACTURING METHOD

[75] Inventor: Kenneth L. Oblizajek, Troy, Mich.

[73] Assignee: General Motors Corporation, Detroit, Mich.

[21] Appl. No.: 128,794

[22] Filed: Sep. 29, 1993

[51] Int. Cl.$^6$ .................. G01M 1/00; G06F 15/20
[52] U.S. Cl. .......................... 364/552; 73/66;
  73/462; 364/463; 364/553; 364/576
[58] Field of Search ............. 73/66, 462; 364/463,
  364/552, 553, 576

[56] References Cited

U.S. PATENT DOCUMENTS

| | | | |
|---|---|---|---|
| Re. 28,775 | 4/1976 | Tarpinian et al. | 73/146 |
| 1,212,701 | 11/1970 | Gough . | |
| 3,147,370 | 9/1964 | Lowman | 364/552 |
| 3,490,277 | 1/1970 | Sanders et al. | 364/576 X |
| 3,719,813 | 3/1973 | Friedman et al. | 364/506 |
| 3,927,561 | 12/1975 | Schleimann | 73/146 |
| 3,948,095 | 4/1976 | Burgett et al. | 73/146 |
| 3,973,112 | 8/1976 | Sloane | 364/553 |
| 4,018,087 | 4/1977 | Wenz | 73/146 |
| 4,545,021 | 10/1985 | Suzuki et al. | 364/571.02 |
| 4,691,564 | 9/1987 | Potts et al. | 73/146 |
| 4,763,515 | 8/1988 | Pielach et al. | 73/146 |
| 4,815,004 | 3/1989 | Beebe | 364/506 |
| 4,969,355 | 11/1990 | Doi et al. | 73/146 |
| 5,214,585 | 5/1993 | Ehrich | 73/462 X |

OTHER PUBLICATIONS

Development of Simplified Two-Axle Tire Uniformity Tester, SAE Technical Paper Series #900758, Satoru Matsushima, Shun'ichi Doi & Yuuzou Yamamoto; Feb. 26–Mar. 2, 1990.

Multiple Input/Output Relationships, Random Data Analysis & Measurement Procedures, Chapter 7, Julius S. Bendat & Allan G. Piersol; pp. 201–251, no date.

Multiple Regression, Probability & Statistics in Engineering & Management Science, Chapter 13, William W. Hines & Douglas C. Montgomery; pp. 392–429, no date.

Environmental Acoustics, Fundamentals of Acoustics, Chapter 12, 3rd Edition, 1982, Lawrence E. Kinsler, Austin R. Frey, Alkan B. Coppens & James V. Sanders; pp. 279–282.

Fourier Analysis of Discrete Signals, Continuous & Discrete Signals & Systems Analysis 3rd Edition, Clare D. McGillem & George R. Cooper, Purdue University; pp. 177–187, 1991.

The Relationship Between Angular Velocity Variations & Fore & Aft Non-Uniformity Forces In Tires, SAE Technical Paper Series #900761, Feb. 26–Mar. 2, 1990.

Shock and Vibration Handbook, Cyril M. Harris, Third Edition; pp. 21-12-21.17, 1961.

Mechanics of Pneumatic Tires, U.S. Dept. of Commerce, Samuel K. Clark, Editor Issued 1971.

New Procedures for Measuring the Influence of Tires on the Vibration of Passenger Cars No. 905220; pp. 777–785, no date.

(List continued on next page.)

Primary Examiner—Edward R. Cosimano
Attorney, Agent, or Firm—Anthony L. Simon

[57] ABSTRACT

A method of manufacturing tires comprising the steps of: constructing a sample set of tires; measuring at least two parameters of each tire of the sample to obtain first and second measurement data; measuring force variations of each tire of the sample set during a rotation test at a select rotation rate to obtain force variation data; determining transfer functions between the first and second measurement data and the force variation data; constructing a set of production tires; measuring the two parameters of the production tires; predicting force variations of the production tires at the select rotation rate based on the transfer functions and the two measured parameters of the production tires; responsive to the predicted force variations, comparing the production tires to predetermined criteria; and controlling manufacture of the tires responsive to the comparison.

24 Claims, 10 Drawing Sheets

OTHER PUBLICATIONS

Force Vibrations–Forcast of Their Entity in Accordance With Speed (No. C279/83) P. Bandel Ing and C. Monguzzi; pp. 19–30.

Uniformity of Tires at Vehicle Operating Speeds, J. C. Walker and N. H. Reeves pp. 163–179, no date.

Force Vibrations of a Tyre Running at High Speed, P. Bandel and G. Ghilardi Pirelli Coordinamento Pneumatici; pp. 795–798, no date.

Testing Machines For Measuring the Uniformity of Passenger Car Tires (SAE J332a) SAE Recommended Practice; pp. 29.05–29.07, no date.

Relative Velocity, Transitional and Rotational; Measurement Systems Applications and Design, Ernest O, Doebelin; pp. 280–291, 1975.

Sheraton–Cadillac Hotel, Detroit, Mich. (Mar. 13–17–1961).

Speed of Rotation, Measurements for Technicians, Abraham Marcus and John D. Lenk pp. 146–149, 1971. The Tire As A Vehicle Component; pp. 585–630, no date.

Measuring Tire Uniformity, Clarence Hofelt, Jr., H. D. Tarpinian and C. Z. Draves, Jr., SAE No. 650522; Mid–Year Meeting, Chicago, Ill. (May 17–21, 1965).

Uniformity Control of Cured Tires, Clarence Hofelt, Jr., SAE No. 690076, International Automotive Engineering Congress, Detroit, Mich. (Jan. 13–17, 1969).

Factors Influencing the Measurement of Tire Uniformity, Donald L. Nordeen and Richard L. Ramsussen, Research Laboratories, General Motors Corp., No. 650734; pp. 466–475, no date.

Tire Uniformity Grading Machine, Society of Automotive Engineers, 1961 SAE National Automobile Week,

TIRE MANUFACTURING METHOD

This invention relates to a method of manufacturing tires, and more particularly to a method of manufacturing tires that includes tire testing using low speed measurements as a basis for predictions of force variations at speeds typical of roadway usage.

BACKGROUND OF THE INVENTION

Periodic sound and vibrations of vehicles are usually detectable on smooth road surfaces at speeds typical of highway road systems, i.e., greater than 40 km/hr. These periodic vibrations represent a recurring pattern of vibrations or force variations and may originate in non-uniform conditions of many of the rotating components or elements of the vehicle, such as the engine, driveline, brake rotors, engine accessories and tire-wheel assemblies, as examples.

Periodic vibrations are so termed because, at a fixed forward speed, they are repetitive in nature, recurring with every successive rotation of the causative component(s). It is common for manufacturers to equip test vehicles with various sound and vibration sensors and then observe prominent periodic content in the measurements.

FIGS. 1, 2 and 3 display spectral analyses of such measurements for an example vehicle operated on relatively smooth pavement. The figures show periodic content of rotating tire-wheel assemblies, with the peaks 230-252 in the graphs reflecting vibration peaks at successive orders of rotation. For example, the first peaks 230 (FIG. 1), 242 (FIG. 2) and 248 (FIG. 3) indicate the vibration occurring at the first order of tire rotation, a recurrent pattern occurring at the frequency of the tire rotation. The second peaks 232 (FIG. 1), 244 (FIG. 2) and 250 (FIG. 3) indicate vibration occurring at the second order of rotation, a recurrent pattern occurring at twice the frequency of tire rotation, etc. FIG. 1 plots a spectrum of vibrations of the steering wheel occurring in the fore and aft direction, which is the direction along that of vehicular travel, one of the three orthogonal directions in space defining a coordinate system for measurement. FIG. 2 plots lateral vibrations, which are transverse to the travel direction and parallel to the plane of the travel surface. FIG. 3 plots vertical vibrations, which are transverse to both the lateral and the fore and aft vibrations, i.e., up and down. Accelerations in FIGS. 1–3 are displayed in units of (g), where 1 g is 9.81 m/s$^2$.

Tire non-uniformities contribute to these plotted vibrations and are caused by structural, geometric and material irregularities of the tire, typically arising due to vagaries of manufacture, resulting in a variety of symptomatic and causal conditions, including, but not limited to, force and geometric variations, axial asymmetry of tread, etc.

Prominent periodic content is readily observed in the figures and contributes to an impression of lack of smoothness expected as the vehicle is operated on the relatively smooth road surface. As can be observed, significant vibrational content is detected at orders including and beyond that of the first. This combined periodic vibrational content contributes to an impression of "lack of smoothness" if high enough in degree.

Often, similar periodic activity is detectable in the measurements of interior sound, where it is common to identify higher order content as responsible for annoyance conveyed through structure-borne acoustic paths. An example of such is shown in FIG. 4, illustrating a spectral plot of in-vehicle sound, measured as sound pressure level (SPL) in mPa, verses frequency. The "A" denotes that the measurements are weighted. A prominent content at the third order of the tire-wheel rotation rate (reference 254) accounts for an impression of an in-vehicle noise characterized by tell-tale bass and relatively long term modulation qualities.

Diagnostic capabilities exist to trace these interior sound and vibrations to their origins, by wheel position. Further decomposition of sources typically incorporates the use of laboratory apparatus for measurements of force variation. There are a number of existing equipment configurations for accomplishing this end, with widespread acceptance and use within the automotive and tire industries.

These laboratory evaluations typically incorporate measurements of the reaction forces of supporting equipment structures as the tire-wheel assembly is restrained and rotated in a manner similar to that occurring on a vehicle on a roadway. Since force systems derive from elastic as well as time-dependent mechanisms, e.g., inertial, it is customary to obtain measurements under a variety of rotational speeds. The faster speeds, then, involve the inertial and the other time dependent mechanisms in addition to the elastic contributions. Still other measurements might involve geometric, mass or physical property variation of the rotating component as it is rotated. These measurements can then be used as indicators of conditions responsible for the road speed excitation of the periodic vehicular sound and vibration.

In the case of force variation of tire-wheel assemblies, periodic force systems are typically assessed on rigidly restrained axle shafts. Assemblies are mounted on rotatable axles which are restrained from translation in all directions. Strategically located force cells are then utilized to measure the reaction forces required to accomplish this fixed translational constraint. In these cases, the tire is constrained to roll against a surface which is either flat (continuous, thin sheetlike metal, driven by suitably arranged rolls providing a flat, rigidly supported surface in the vicinity of tire contact, simulating flat roadway systems) or curved in the case of rigid drive or reaction rolls. Periodic force systems, derived from a single period of the tire rotation, or multiples thereof, can be obtained at any and all speeds of interest.

Some of these force systems are notably speed dependent, such as fore and aft forces as shown in FIGS. 5 and 6. FIG. 5 displays laboratory apparatus measurements of the "second order" of the periodic fore and aft force variation measured in units of Newtons, N, as they depend on speed. FIG. 6 is a similar display showing the "third order" of the periodic fore and aft force variation as a function of speed. Each trace in the two figures represents measurements for a different tire. As can be seen from these figures, the forces are extremely small at reduced speeds. They can, however, achieve sizable amplitudes at speeds typical of roadway usage as illustrated in the figures.

The amplitudes of these forces at highway speeds, furthermore, are indicative of the periodic vehicular excitation. Other modes of tire force excitation, such as radial or lateral force, however, do exhibit measurable levels at low speeds. FIG. 7, for example, illustrates the amplitude of a second order content of radially directed tire-wheel force variation as a function of speed, as measured on a laboratory apparatus of a type available to those skilled in the art. Each trace represents the radial force variation for a different tested tire. FIG. 7 illustrates that radial force variations are detectable at low as well as highway speeds.

The convenience of measurement at low speed enables assessment of tires and implementation of specifications suggestive of maximum permissible roadway usage levels. Many vehicle manufacturers, thus, have set forth various specifications on these force systems (radial and lateral force variations) that are observable at low speeds. Manufacturers of tires for original equipment applications utilize end-of-line (finished product) measurements to accomplish and assure compliance to these specifications on a 100% inspection basis (comparing each manufactured tire against standards of performance). These end-of-line measurements entail force and/or geometric measurements of the tire inflated and mounted on a wheel or split chuck apparatus operated at extremely low speeds, i.e., at tire shaft rotational rates of approximately 1 cps, corresponding to vehicle speeds of less than 10 km/h.

SUMMARY OF THE INVENTION

Advantageously, this invention provides a tire manufacturing process that reliably assesses the amplitude, on an individual tire basis, of highway speed force variations representative of force variations that would exist at roadway speeds, based on measurements taken at low speeds. This invention advantageously enables such assessment by predicting the amplitudes of the roadway-typical forces from special measurements and combinations thereof obtained at low speeds.

Advantageously, this invention enables a tire manufacturer to utilize common, existing end-of-line inspection equipment, when suitably modified to measure the critical parameters (if necessary), for an assessment of a given tire's propensity to generate periodic, dynamic forces as measured on conventional highway speed laboratory apparatus. This, in turn, enables vehicle manufacturers to specify acceptable predicted highway speed forces, allowing the elimination of potentially noisy tires through a sorting process at the tire manufacturer and allowing assembly of vehicles using only tires whose predicted force variations meet predetermined criteria.

Advantageously, this invention also enables the tire manufacturer to diagnose contributions to highway speed forces from the manufacturing process.

The contributing role of various measurable low speed quantities to the dynamic, highway speed, fore and aft forces of a tire has been demonstrated long ago. British Patent No. 1,212,701, published Nov. 18, 1970, noted the link between "variation in tire effective rolling radius from one part of the tire to another" and the "variations of drag force" (drag force herein referred to as fore and aft force). The referenced patent describes apparatus and method for assessing dynamic fore and aft forces by measurement of the "variation in effective rolling radius" at "conveniently measurable relatively low speed" and "then calculating from the known constants of the rotating system . . . the variation in drag force at relatively high speeds." U.S. Pat. No. 4,815,004, issued Mar. 21, 1989, arrived at the same conclusions. The effective rolling radius is the ratio of instantaneous vehicle forward speed to angular velocity of the tire-wheel assembly. On a laboratory or plant apparatus, the effective rolling radius is the ratio of instantaneous linear velocity of the external drum surface against which the tire is rolled to the angular velocity of the tire-wheel assembly. Variations in effective rolling radius are typically periodic in tire rotation, being a function of the relative angular position of the tire and drum.

Other investigators have reported the involvement of multiple sources of the fore and aft force, some by postulating particular mechanistic origins, such as invoking an energy balance, a-priori linking the radial force variation to the fore and aft force variation. Evidence for the existence of these sources is likewise documented in the literature. Simplified mechanistic models have long been in existence to explain and rationalize the postulated mechanisms of these forces. As modem technological advances, such as with discretized multi-degree-of-freedom modeling, permit today's investigators to appreciate the role of various design and manufacturing irregularities in the approximated rolling process of toroidal continua, such as the tire, these simplified previous approaches are recognized to be limited in detail.

Advantageously, this invention provides a method of manufacturing tires for a motor vehicle that predicts the highway speed force variations of a tire based on low speed measurements and allows elimination of those tires, through a sorting process, whose predictions indicate unacceptable highway speed force variations. Carrying out the method of this invention to accomplish this end comprises the steps of: constructing a sample set of tires; measuring at least two parameters of each tire of the sample to obtain first and second measurement data; measuring force variations of each tire of the sample set during a rotation test at a select rotation rate to obtain force variation data; determining complex transfer functions between the first and second measurement data and the force variation data; constructing a set of production tires; measuring the two parameters of the production tires; predicting force variations of the production tires at the select rotation rate based on the complex transfer functions and the two measured parameters of the production tires; responsive to the predicted force variations, comparing the production tires to predetermined criteria; and controlling manufacture of the tires responsive to the comparison.

In one implementation of the method of this invention, sorting is accomplished responsive to the comparison step to son tires based on predicted force variations.

In one implementation of the method of this invention, the first and second measurement data is obtained during low speed measurements (i.e., corresponding to less than 10 km/h) and the select rotation rate at which force variations are predicted corresponds to a highway speed. Thus, this invention allows for the prediction of highway speed force variations based on low speed measurements.

In yet another implementation of this invention, the complex transfer function determination includes: determining Fourier series components at orders of tire rotation for the first and second measurement data; determining Fourier series components at orders of tire rotation for the force variation measurement data; extracting, from the Fourier series components of first and second measurement data and the force variation measurement data for each sample tire, data corresponding to a selected order of tire rotation; using the extracted data, determining a set of complex quantities: $C_{xzn}$, $C_{xrn}$, $C_{zzn}$, $C_{zrn}$, $C_{rzn}$ and $C_{rrn}$ according to an equation $$C_{abn} = \frac{\sum_{m=1}^{N_2} F_{anm} F^*_{bnm}}{N_2}$$

where F is a complex quantity representing the extracted phasor quantities, the symbol (*) is the notation for the complex conjugate, $N_2$ is the number of tires in the sample set and a and take on the following paired combinations:

| a | b |
|---|---|
| x | z |
| x | r |
| z | z |
| z | r |
| r | z |
| r | r | where the n represents the selected order and m represents the tire number, where x denotes a second speed force measurement, r denotes low speed first measurement data and z denotes low speed second measurement data; and responsive to $C_{xzn}$, $C_{xrn}$, $C_{zzn}$, $C_{zrn}$, $C_{rzn}$ and $C_{rrn}$, determining the complex transfer functions relating the first and second measurement data to the force variation measurement data.

Thus, advantageously, this invention provides for improved prediction of force variations, including fore and aft force variations, for highway speed rotation based on measurements taken at low speed rotation. Advantageously, this invention provides predictions with high accuracy based on measurements of two or more parameters of a select set or based on measurements of parameters correlating to the two or more parameters of the select set.

In another embodiment, this invention advantageously provides for the sorting of tires according to grades by comparing the predicted forces for a production tire to predetermined "grading" levels. In this manner, this invention allows tires to be graded as suitable for specific vehicular applications.

A more detailed description of this invention, along with various embodiments and additional advantages thereof, is set forth below.

DETAILED DESCRIPTION OF THE INVENTION

Figure 1:
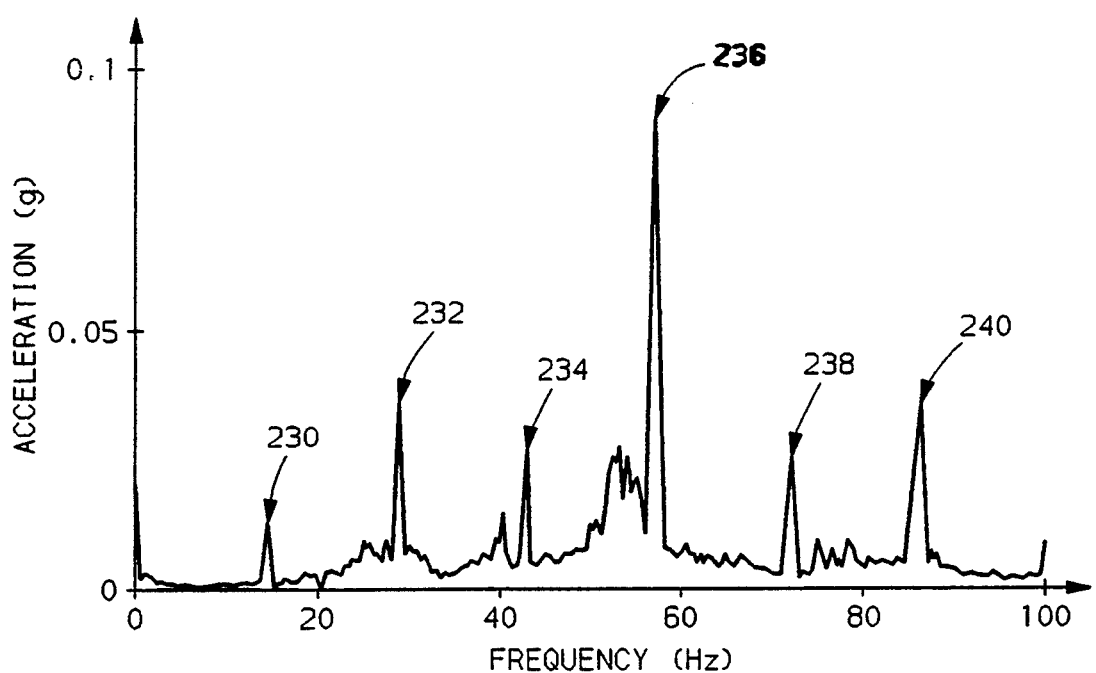
FIGS. 1, 2, and 3 illustrate spectral analysis of periodic tire-wheel induced vibrations observable at typical interfaces of occupants of moving vehicles.
Figure 2:
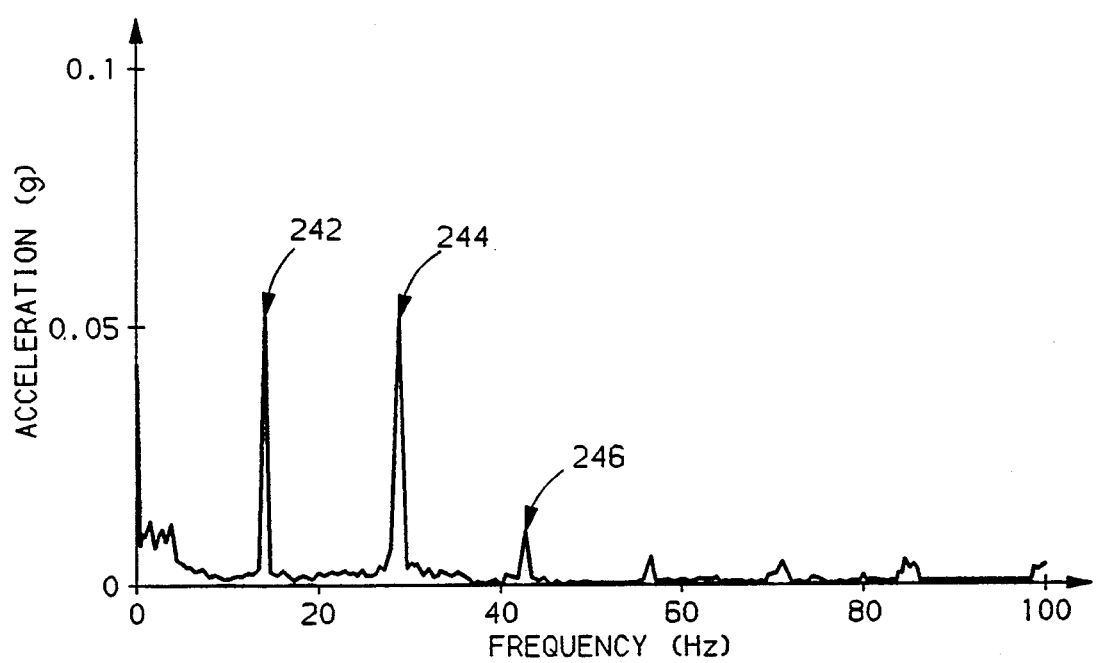
Figure 3:
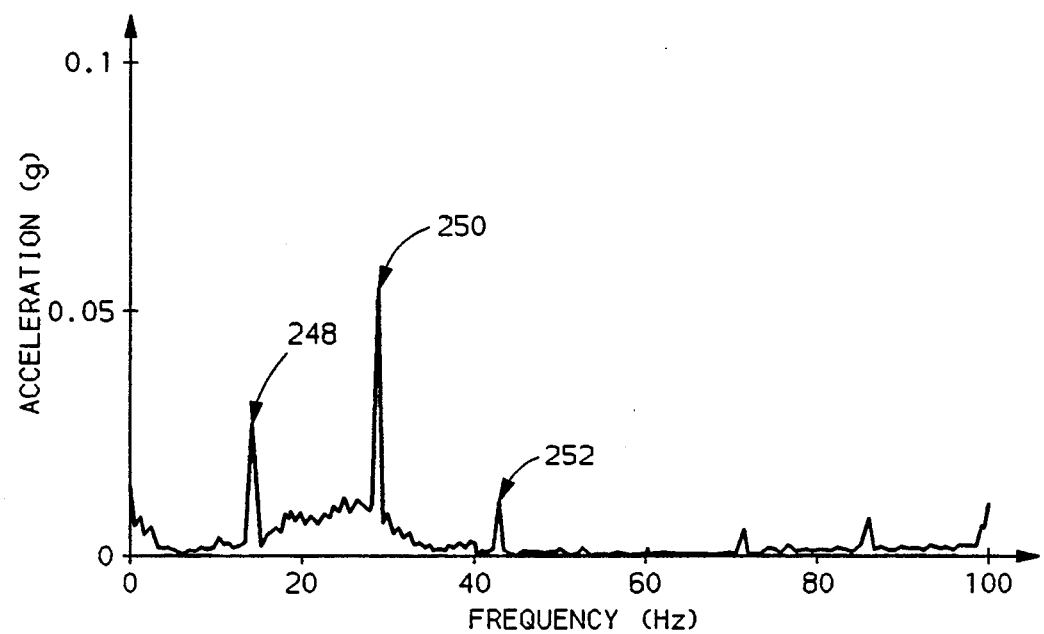
Figure 4:
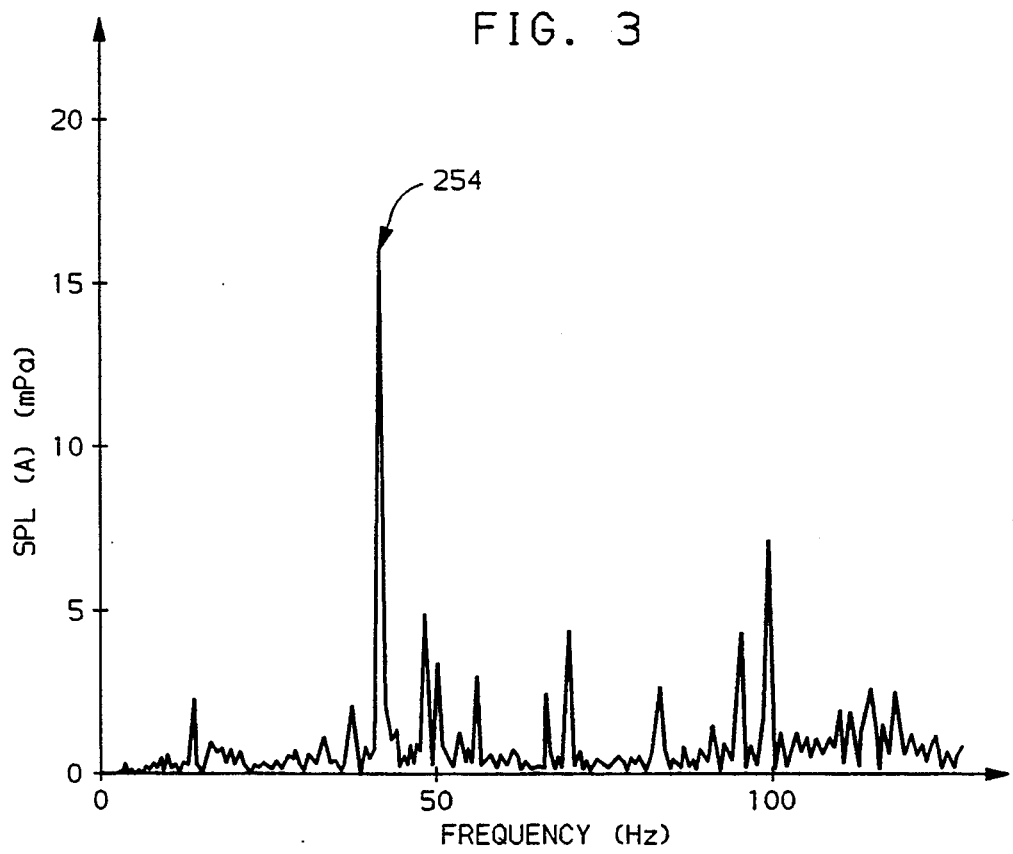
FIG. 4 illustrates a spectral plot of in-vehicle sound indicative of prominent vibratory content of third order of tire-wheel rotation rate.
Figure 5:
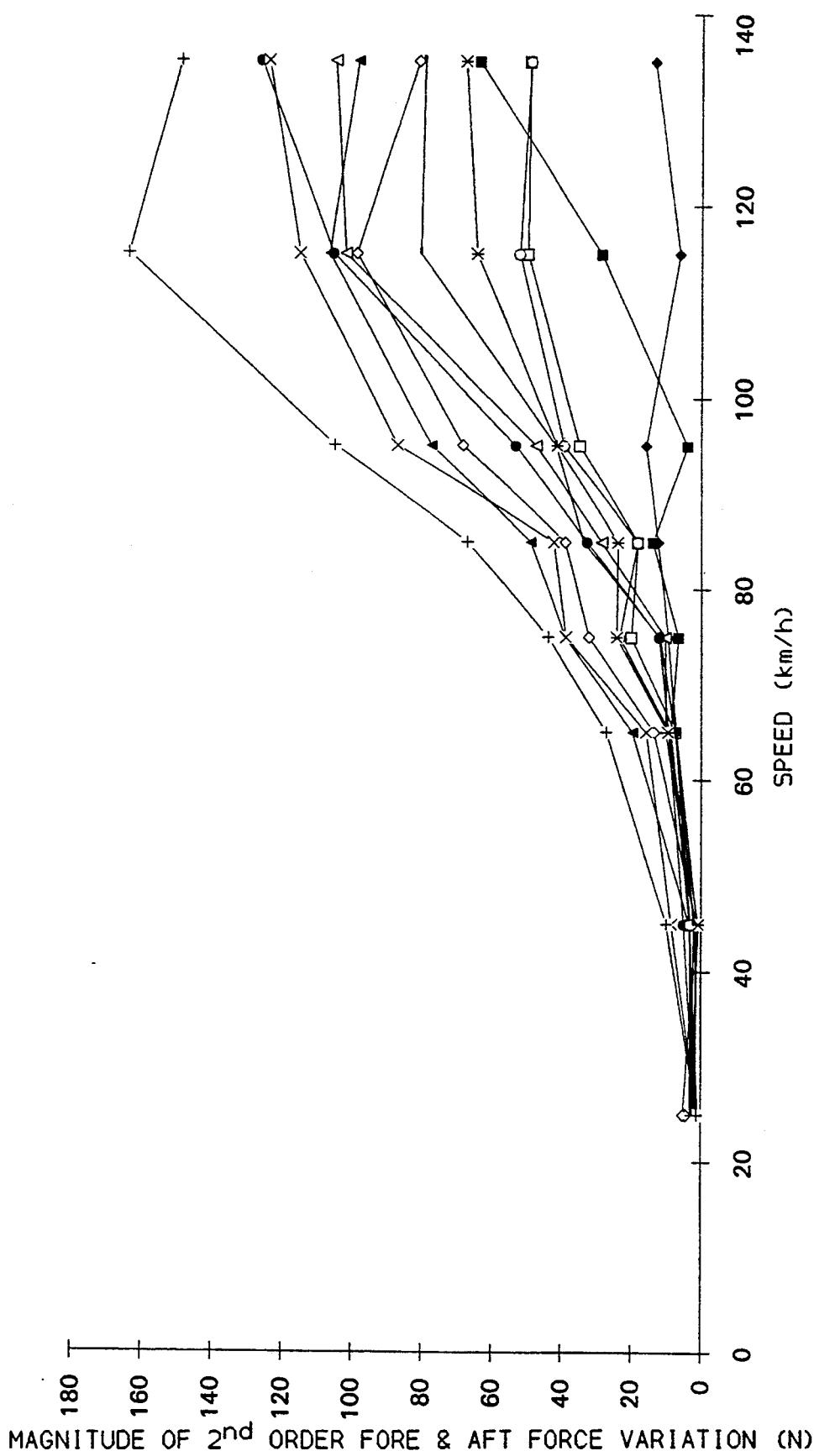
FIGS. 5 and 6 illustrate second and third order fore and aft force variations in relation to rotational speed.
Figure 6:
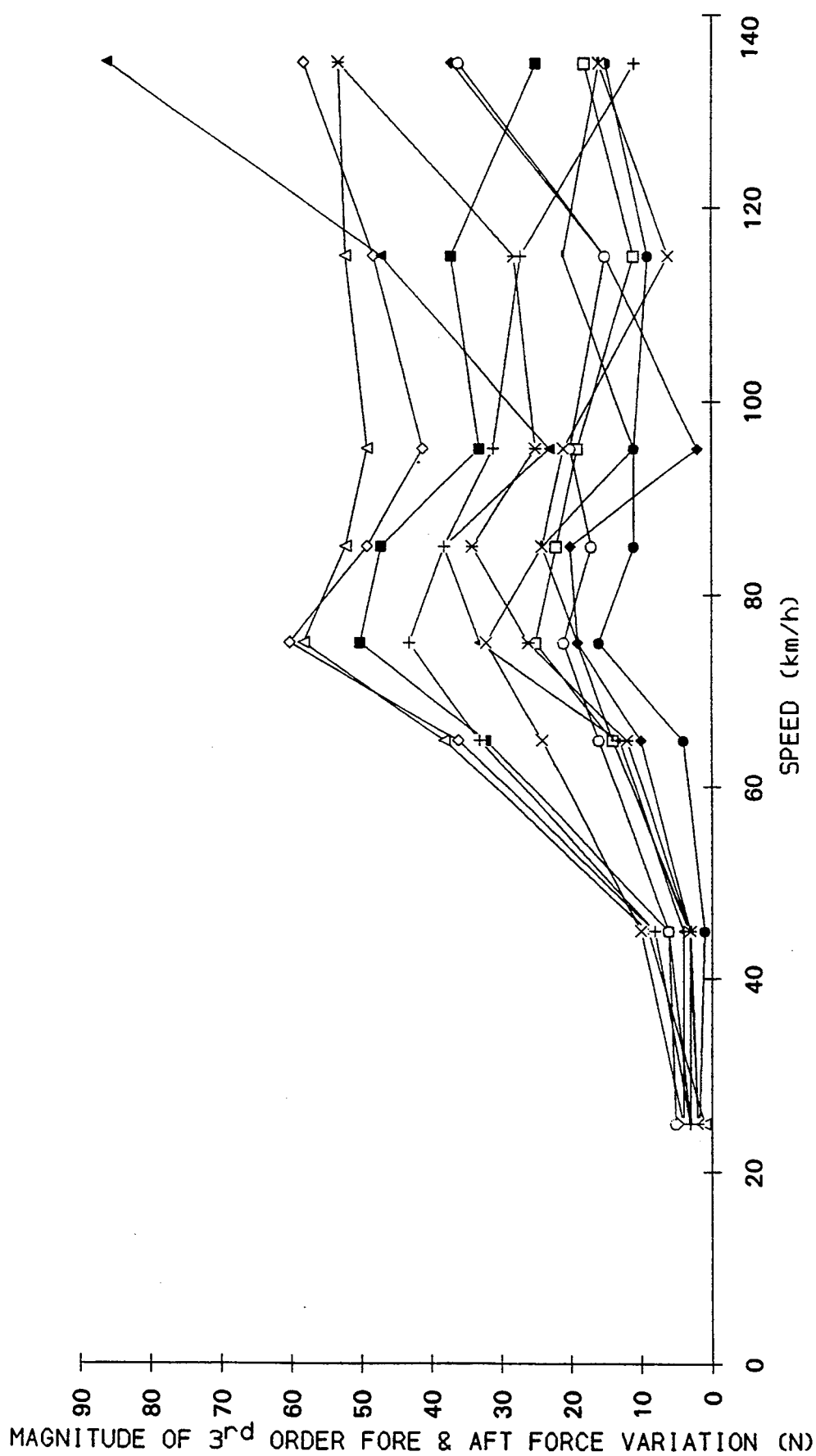
Figure 7:
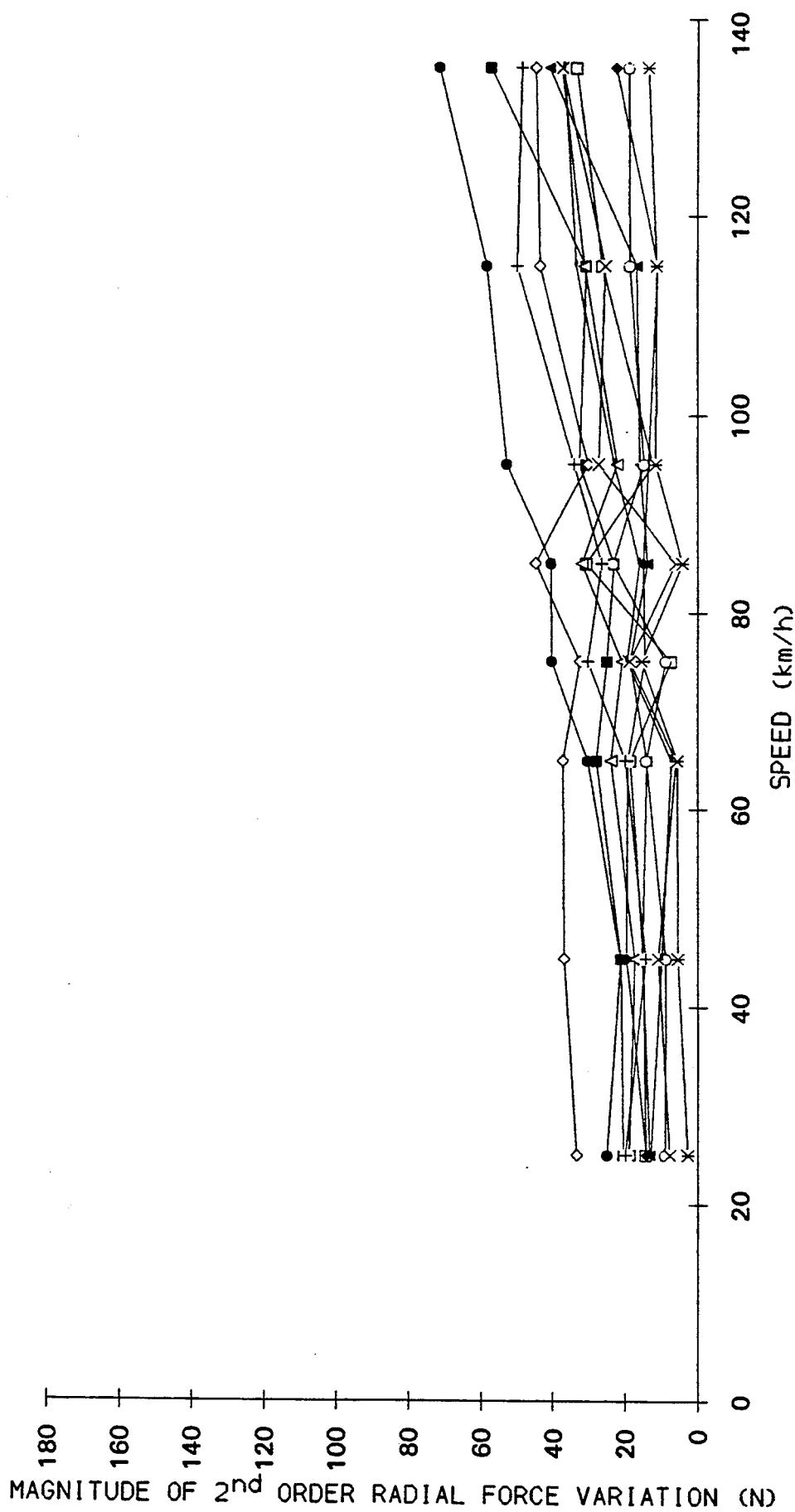
FIG. 7 illustrates measured second order content of tire-wheel radial force variation in relation to rotational speed.
Figure 8:
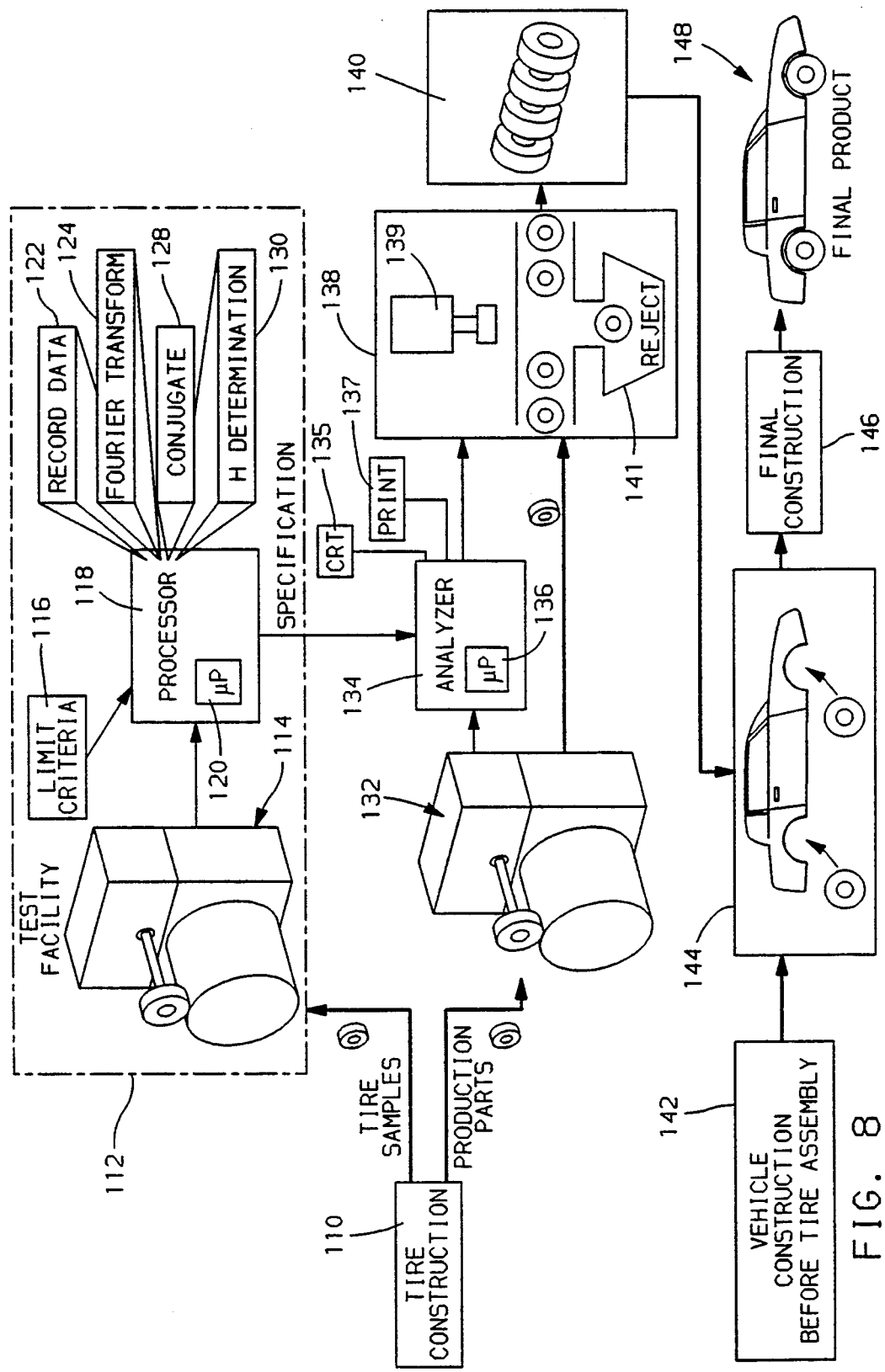
FIG. 8 illustrates the method of manufacture according to this invention.

Referring to FIG. 8, the preferred method of manufacture according to this invention begins with the construction of several tires (block 110), all of the same model or type, in a manner known to those skilled in the an and currently used by tire manufacturers. The several tires are taken as a sample set to a test facility 112, which may be at a location the same as or different from the location of the tire construction facility 110.

The test facility includes a tire testing apparatus 114 of a type well known to those skilled in the an that is suitable for both low and highway speed tire testing. Each test tire of the sample set is mounted on tire testing apparatus 114, which rotates the tire against a drum or flat track to simulate road travel of the tire. First the test apparatus 114 rotates the tire at a low rotational speed (i.e., corresponding to a tire speed of less than 10 km/h) and, while the tire is rotating at the low rotational speed, measures at least two tire parameters from a set comprising: variations in effective rolling radius, radial force variation, geometric runout variation, and fore and aft force variation. Processor 118, which includes a microcomputer 120, retains (block 122) in memory the measurement data obtained by testing apparatus 114.

Testing apparatus 114 then rotates the tire against the drum or flat track at a high rotational speed (i.e., corresponding to a tire speed of 60–160 km/h) and measures the fore and aft force variations of the tire. Processor 118 receives the data resulting from the fore and aft force variation measurements from tester 114 and retains (block 122) the data in memory.

Testing apparatus 114 may, in alternative, be of a type well known to those skilled in the an in which the tire is mounted on a simulated automobile suspension unit. Such testing apparatus typically measure vibrations occurring in the simulated suspension unit. However, the vibrations occurring in the simulated suspension unit have a high degree of coherence with (i.e., correspondence to) fore and aft force variations, indicating that the measurements are highly interrelated, thus providing measurement signals indicative of the fore and aft force variations.

Processor 118 then processes the retained low and highway speed data, including obtaining Fourier series components (124) thereof, and determines (blocks 128 and 130), in the manner described in more detail below, multi-parameter phasor relationships (or complex quantity transfer functions) between the low speed measurement data and the highway speed fore and aft force measurement data. Once the multi-parameter phasor relationships are determined, highway speed fore and aft force data are predicted according to this invention for production tires based on low speed measurements. The predictions are then used according to this invention to sort and/or grade tires before the tires are assembled onto automobiles.

More particularly, this invention implements a methodology of predicting periodic, dynamic force systems of conventional pneumatic tires arising at normal highway speeds, i.e., 60–160 km/h from combinations of measurements obtained at low speeds (e.g., 4 km/h). Measurements of various low speed observable quantities, such as radial force variation, effective rolling radius, geometric runout and fore and aft force variation comprise, according to this invention, the basis for predicting the dynamic forces occurring at normal highway speeds.

Radial force variation arises and is measurable on conventional laboratory and plant apparatus (i.e., apparatus 114 and/or apparatus 132) readily available to those skilled in the art. With such equipment, the tire is typically mounted on split chucks or a conventional wheel. The wheel, in turn, is affixed to a rotatable shaft, otherwise restrained from any translational movement in all directions. A load is typically imposed on the tire by impressing a drum into contact with the tire and forcing interference, deforming the tire and causing a measurable load to result. Occasionally, and increasing in acceptance, is the use of a flat surface to impose a prescribed load in place of the drum as described above. With a prime mover attached to either the tire or drum shafts, rotational movement of the tire occurs at speeds corresponding to tire shaft rotational rates of approximately 1 cps, for low speed testing.

Test apparatus 114 of the type generally available typically include a loading system that initially permits slow adjustments in the interference of the tire and drum, thereby achieving targeted mean loads as desired. After the targeted mean load is achieved, further adjustments are disabled, essentially fixing for all practical purposes the separation of tire and drum rotation axes.

Continued rotation of the tire and drum results in a measurable level of variations of radial force, defined as "radial force variation." These force variations arise from the structurally imperfect nature of tires and, as expected, result in a recurrent, periodic pattern with periodicity corresponding to the full rotation of the tire.

Figure 9:
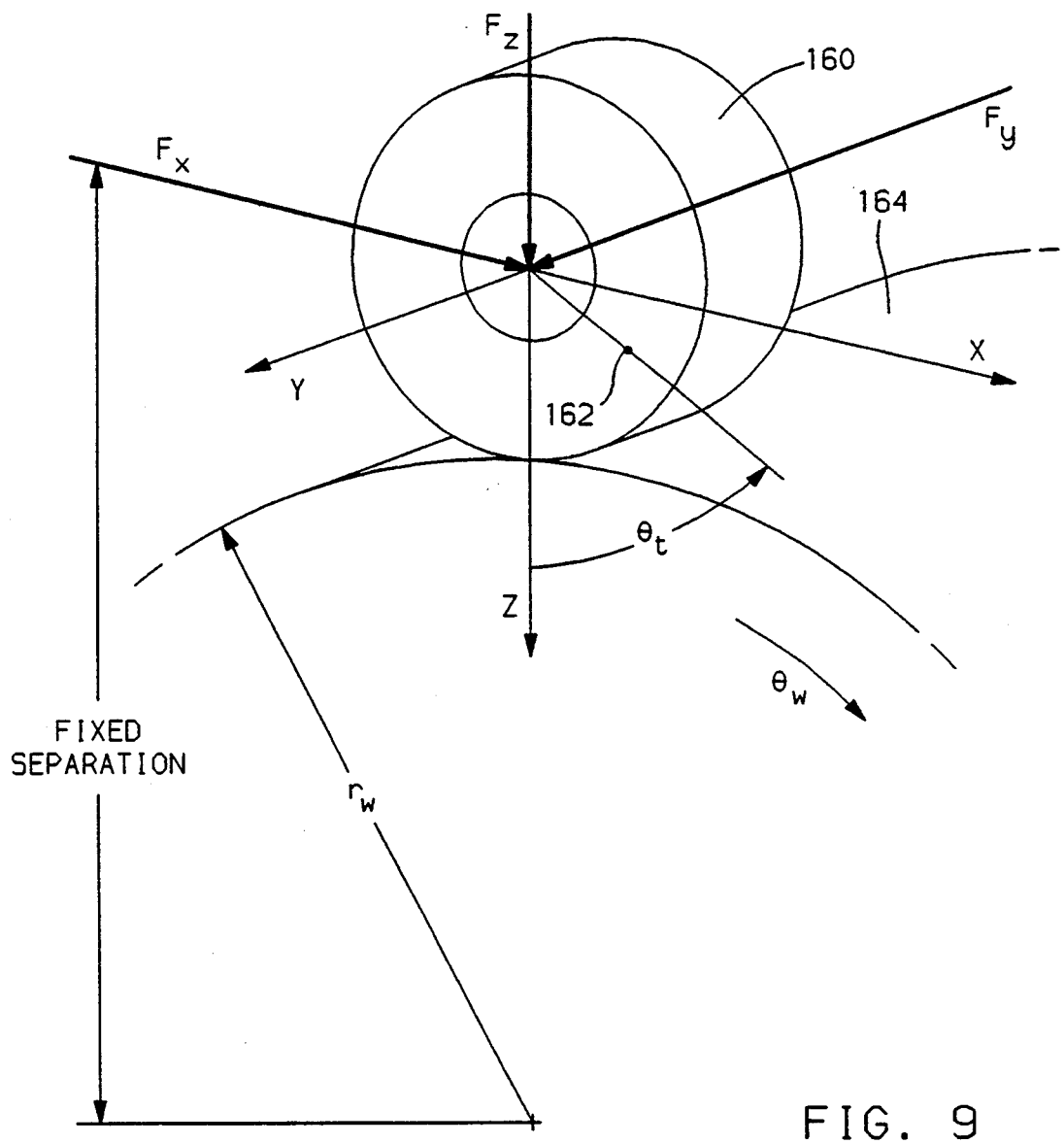
FIG. 9 schematically illustrates a loaded tire-wheel on a test drum for explanation purposes.

Referring now also to FIG. 9, there is shown schematically a tire 160 rolling against a drum 164 of a conventional test apparatus. An arbitrary reference point 162 is shown on the tire 160. $\theta_t$ represents the angle between the reference point 162 and the z axis and is the angular position, in radians, of the tire-wheel assembly on the measurement apparatus with reference to reference point 162. Reference point 162 is an arbitrarily selected position that is common for all subsequent measurements of a given tire. The symbol $r_w$ represents the radius of the drum 164 and $\theta_w$ represents the angular position of the test drum 164.

The measured periodic radial force variation is decomposed into its Fourier series components, which are members of a series of cyclic trigonometric functions with the base rate equal to that of the rate corresponding to one tire revolution, having components at integer multiples of the base rate, so that the first order is at the base rate, the second order is at twice the base rate, etc. The Fourier components retain both amplitude and phase information and are represented as:

$$F_{zn} = 1/(2\pi) \int_0^{2\pi} f_z(\theta_t) e^{-in\theta_t} d\theta_t \qquad \text{Equation (1)}$$

where $f_z$ is the measured periodic radial force variation over at least one complete revolution of the tire shaft or, in the case of multiple revolutions, the averaged results of the multiple revolutions, $F_{zn}$ is the complex quantity representing amplitude and phase of the $n^{th}$ order content of the force variation and is determinable by those skilled in the art of Fourier transforms, e is the natural log base and i is the square root of (−1).

When discrete sampling of the desired quantities are used, alternate forms of equation (1) above and those that follow, more suitable for the treatment of discrete samplings and easily implemented by those skilled in the art in response to the teachings herein, may be used.

Many devices for accomplishing these measurements are in common use today, examples of which are described in U.S. Pat. Nos. 4,969,355, 4,018,087 and 3,927,561.

An alternative apparatus permits freedom of translational movement of the rotatable shaft(s) along a line connecting their centers, while impressing an invariant load, $F_z$. Measurements then include the variation in separation between the two shafts as a function of the angular orientation of the tire. This variation in separation distance would then be decomposed into its Fourier components in a manner identical to that of the radial force variation described above. An alternative implementation then, would include substitution or augmentation of radial force measurements with measurements of separation distances.

According to this invention, effective rolling radius of the tire rotated at the low speed is determined according to the equation:

$$r_t(\theta_t) = r_w(d\theta_w/dt) \qquad \text{Equation (2)}$$

where $r_t(\theta_t)$ is a variable derived from measurements of incremental changes in $\theta_w$ and $\theta_t$ as the tire rotates. Testing apparatus 114 (and/or 132), used to measure radial force variation as described above, can be used to obtain the required measurements for equation (2). For these measurements, apparatus 114 requires sensors enabling precise measurement of the angular movements of the two shafts, i.e., tire and drum. Specific examples of appropriate sensors are described in U.S. Pat. No. 4,815,004 and British Patent No. 1,212,701.

Variation in effective rolling radius, $r_t(\theta_t)$, is decomposed into its Fourier components according to the equation:

$$F_{rn} = 1/(2\pi) \int_0^{2\pi} r_t(\theta_t) e^{-in\theta_t} d\theta_t \qquad \text{Equation (3)}$$

where $r_t$ is the measured periodic variation in effective rolling radius over at least one complete revolution of the tire shaft, or, in the case of multiple revolutions, the averaged results of the multiple revolutions and $F_{rn}$ is the complex quantity representing the Fourier component of $r_t$ at order n.

According to this invention, it may also be desirable to determine the geometric runout, or the variation in outer surface dimension of the tire as a function of $\theta_t$. In general, geometric runout is determined by mounting one or more contact or non-contact linear displacement sensors near the tire, rotating the tire about its intended axis of rotation past the sensor(s) and determining the variation in external dimensions of the tire as a function of rotational orientation $\theta_t$. U.S. Pat. Nos. 3,719,813 and Re 28,775 describe suitable test equipment for determining geometric runout.

Geometric runout, $u_t(\theta_t)$, is decomposed into its Fourier components as follows:

$$F_{un} = 1/(2\pi) \int_0^{2\pi} u_t(\theta_t)e^{-in\theta_t}d\theta_t \qquad \text{Equation (4)}$$

where $u_t$ is the measured periodic variation in geometric runout over at least one complete revolution of the tire shaft, or, in the case of multiple revolutions, the averaged results of the multiple revolutions, and $F_{un}$ is the complex quantity representing the Fourier component of $u_t$ at order n.

Next, according to this invention, the test apparatus 114 measures actual fore and aft forces at one or more speeds typical of highway usage, i.e., 60–160 km/h. Note that test apparatus 114, to obtain the highway speed fore and aft force measurement, may differ from the typical low speed measurement apparatus in that it includes force reaction cells that are sensitive in the fore and aft direction (FIG. 9). Also, apparatus 114 is typically stiffer than low speed test equipment and free of extraneous resonances within the desired measurement bandwidth. Examples of suitable equipment are set forth in U.S. Pat. Nos. 4,691,095, 4,763,515 and 3,948,095.

With test apparatus 114, it is possible to evaluate force variation at a variety of speeds demonstrating that the measured responses range considerably over normal variations in highway speeds. At any prescribed speed, it is possible to obtain a measurement that, like that of the low speed radial force variation, will be periodic in tire rotation.

The measured fore and aft force variation at highway speed (i.e., in the range of 160–160 km/h.) is decomposed using the following:

$$F_{xn} = 1/(2\pi) \int_0^{2\pi} f_x(\theta_t)e^{-in\theta_t}d\theta_t \qquad \text{Equation (5)}$$

where $f_x$ is the measured periodic fore and aft force variation at the selected speed (typically >60 km/h) over at least one complete revolution of the tire shaft, or in the case of multiple revolutions, the averaged results of the multiple revolutions, and $F_{xn}$ is the complex quantity representing the Fourier component of $f_x$ at order n.

Figure 10:
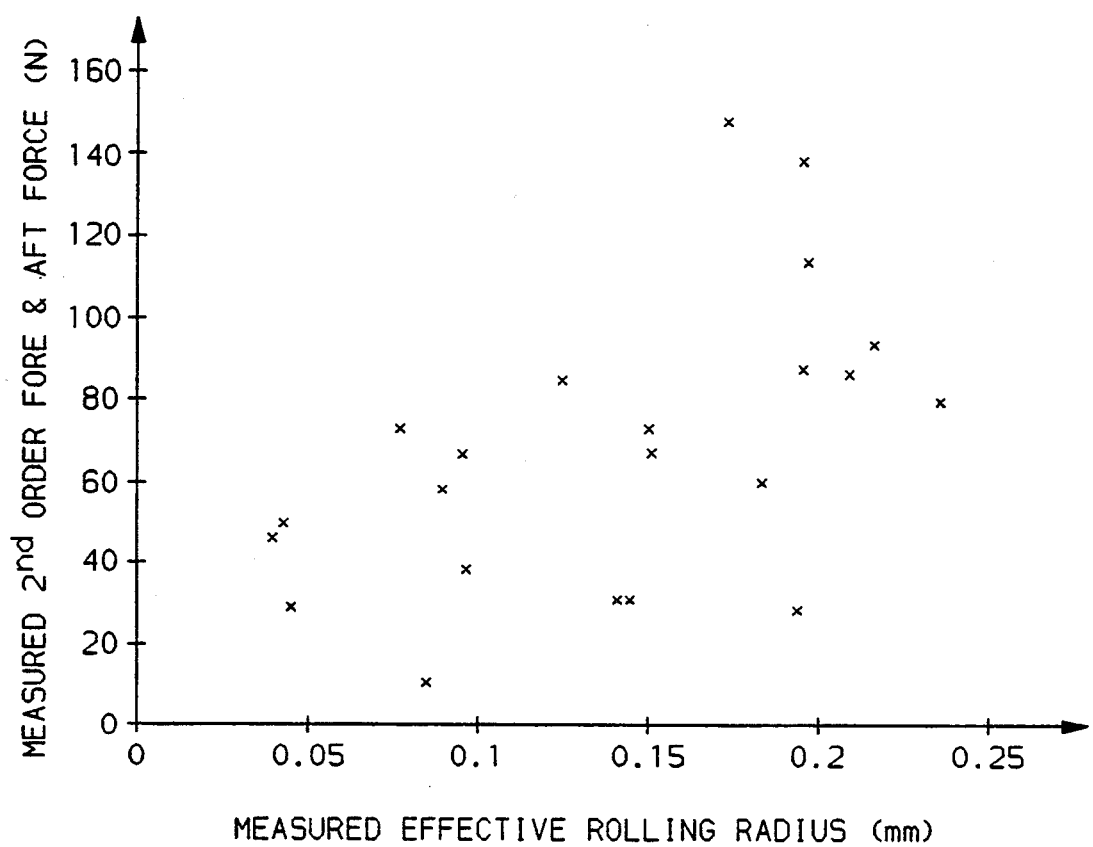
FIG. 10 illustrates a plot of effective rolling radius and fore and aft force variations.

It has been suggested that the measurement of variations in effective rolling radius at low speeds are sufficient to capture the propensity of a tire to generate dynamic, highway speed, fore and aft forces. FIG. 10 illustrates a plot of data indicating effective rolling radius variations, at the second order of tire rotation rate, verses highway speed fore and aft force measurements. Although occasional samplings of tires correlate the measured fore and aft forces and the effective rolling radius, too often a lack of correlation is observed, which illustrates that the measure of effective rolling radius variations alone does not dependably indicate highway speed fore and aft forces to a highly accurate degree.

Thus, according to this invention, additional independent parameters indicative of highway speed fore and aft force variations are considered, with the requirement that the additional parameters can be derived from readily measurable low speed quantities.

According to this invention, it is recognized that there exists more than one mechanism, measurable or representable by low speed measurements, contributing to highway speed fore and aft forces. The difficulties in attempting to ascertain relationships between low speed measurements and the highway speed fore and aft forces is the complicating factor involving phasor quantities. Known techniques such as multiple regression and correlation analyses are incapable of readily addressing this aspect. This invention, advantageously, accommodates the complexity of phasor quantities enabling the determination of relationships between low speed measurements and high speed forces.

For a given tire, the collective measurements appear as $F_{znm}$, $F_{rnm}$, and $F_{unm}$, where $F_{znm}$ is the radial force component of tire 'm', at order 'n' for measurement quantity $f_z$; $F_{rnm}$ is the effective rolling radius component of tire 'm', at order 'n' for measurement quantity $r_t$; and $F_{unm}$ is the geometric runout component of tire 'm', at order 'n' for measurement quantity $u_t$. Likewise $F_{xnm}$ represents the fore and aft force component measured at the selected highway speed of tire 'm', at order 'n'.

Assuming a relationship accepted as a generalized linear system relationship to those skilled in the art, one can expect that, for a given tire, these quantities are related by the following equation:

$$F_{xnm} = H_{zn}F_{znm} + H_{rn}F_{rnm} + H_{un}F_{unm}, \qquad \text{Equation (6)}$$

where $H_{zn}$ is the complex quantity transfer function relating $F_z$ at order n to $F_x$ at order n, where $H_{rn}$ is the complex quantity transfer function relating $F_r$ at order n to $F_x$ at order n, and where $H_{un}$ is the complex quantity transfer function relating $F_u$ at order n to $F_x$ at order n. The transfer functions, H, operate on the respective measurement phasors and capture the system dynamics of the tire-wheel and the specific manner by which tire irregularities combine to produce low speed variations, directly measurable in and contributing to low speed radial forces.

The following summarizes a development of equation (6).

Figure 11:
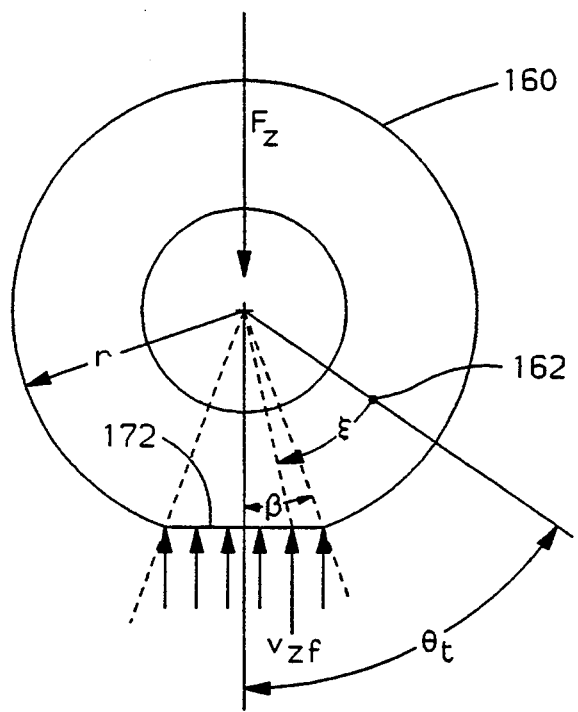
FIG. 11 illustrates schematically the relationship between radial force and an intensity function $v_{zf}$.

Referring to FIG. 11 for an example illustration, radial force can be considered as an integral of stresses exerted at the interface 172 of the tire 160 and the test surface (not shown). For purposes of this explanation, it is assumed that radial force at any instant is the integral of an intensity function, $v_{zf}$ with units of force/length, acting normal to the surface of contact, which varies as a function of $\epsilon$, the angle between reference 162 and the representative location of $v_{zf}$ displayed in FIG. 11.

The intensity function can also be visualized as the integral of tire and drum interfacial stress acting normal to the contact surface over an infinitesimally narrow dimension along the x-direction, yet extending over the full tread face of the tire in the y-direction. The irregularities of the tire, then, produce variation in this intensity function. The variations in the intensity function at the contact of the tire and drum are summed to produce the observed radial force for that particular orientation of tire and drum, $\theta_t$.

As illustrated below, appropriate manipulation of the continuously varying quantity, $f_z(\theta_t)$, can lead to an assessment of the intensity function. Consider:

$$f_z(\theta_t) = \int_{\theta_t - \beta}^{\theta_t + \beta} v_z(\xi)d\xi \qquad \text{Equation (7)}$$

where $v_{zf}$ is the force intensity function and $\beta$ is tire and test apparatus contact half-angle.

Equation (7) can be differentiate with respect to $\theta_t$, yielding:

$$df_z i/d\theta_t = v_{zf}(\theta_t + \beta) - v_{zf}(\theta_t - \beta) \qquad \text{Equation (8)}$$

Laplace transforming equation (8), it can be shown that:

$$V_{zf}(s_x) = (s_x \bullet F_z(s_x))/(\exp(\beta \bullet s_x) - \exp(-\beta \bullet s_x)) \qquad \text{Equation (9)}$$

which is bounded if $\omega$ is not equal to $q\pi/\beta$, where $q=0$, 1, 2 ... where $q=0, 1, 2 \ldots$, $s_x = i\omega_x$ and $V_{zf}$ is the Laplace transform of $V_{zf}$.

Equation (9) indicates that a transformation of the measured radial force variation, $f_z(\theta_t)$ or its Laplace transform $F_z(s_x)$, can lead to determination of the intensity function $V_{zf}(\theta_t)$ or its transform $V_{zf}(s_x)$. Assuming that the intensity function, $v_{zf}(\theta_t)$ and $V_{zf}(s_x)$, arises from an imposed dimensional variation defined as $v_{zu}(\theta_t)$ and $V_{zu}(s_x)$, these two quantities are related by a constant stiffness parameter, $k_{eff}$, for example:

$$V_{zu}(s_x) = V_{zf}(s_x)/K_{eff} \text{ and } v_{zu}(\theta_t) = v_{zf}(\theta_t)/k_{eff}$$

Figure 12:
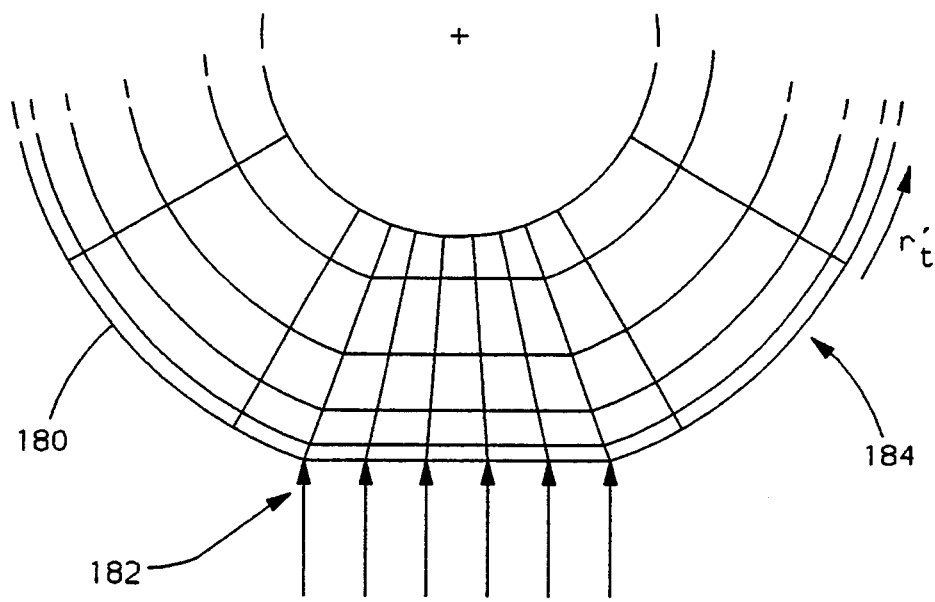
FIG. 12 illustrates a discretized tire model.

FIG. 12 illustrates a simplified multiple degree of freedom model of a tire 180. The model illustrates an enforced displacement 182 of the tire at the tire and drum forced contact. The enforced displacement 182 is determined by $v_{zu}$. The model also illustrates an enforced displacement $r_t'$ 184.

Referring to the tire model, the generalized equations of motion for the model can be expressed as follows:

$$[M]\{w''\} + [C]\{w'\} + [K]\{w\} = \{f_{ext}\} \qquad \text{Equation (10)}$$

where[] denotes matrix quantities, {} denotes vector quantities, the ' denotes differentiation with respect to time, M is the mass matrix, C is the damping matrix, K is the stiffness matrix, w is the displacements of nodes (connection points of finite elements) and $f_{ext}$ represents functions related to external forces.

Supplemental to Equation (10) is the following:

$$\{f_{ext}\} = [C]\begin{bmatrix} v_q'^d \\ u_{tq}'^d \\ r_t'^d \end{bmatrix} + [K]\begin{bmatrix} v_q^d \\ u_{tq}^d \\ r_t^d \end{bmatrix} \qquad \text{Equation (11)}$$

where $q=1,2,3 \ldots$ (node number) and $(^d)$ represents discretized equivalents of the aforementioned various quantities, easily obtainable by those skilled in the art. Taking Laplace transforms of equation (10) yields:

$$[[M]s^2 + [C]s + [K]]\{W(s)\} = \{F_{ext}(s)\} \qquad \text{Equation (12)}$$

where $W(s)$ represents the Laplace transform of w and $F_{ext}$ represents the Laplace transform of $f_{ext}$. It can be shown, according to Equations (9), (10), (11) and (12), that:

$$F_x(s) = (p_1(s)/p_2(s)) \bullet F_z(s) + (p_3(s)) \bullet F_r(s) + (p_5(s)/p_6(s)) \bullet F_u(s) \qquad \text{Equation (13)}$$

where $p_q(S)$ represents a resultant polynomial in complex Laplace variable 's'. As those skilled in the art will observe, equations (12) and (6) have similar form.

If the quantities $H_{zn}$, $H_{rn}$, $H_{un}$ ... are known, then Equation (6) can be used to predict $F_{xn}$. This has generally not been the case because the particular details and manner by which parameters such as tire mass, stiffness, and damping matrices or the equivalents, combine to effect the polynomials $p_q(s)$ are unknown. However, as recognized by this invention, for quantities of tires manufactured by an individual tire manufacturer to a given engineering specification, i.e., where all tires are intended to be identical, these parameters will be relatively invariant among these ostensibly identical tires. Variations between tires, furthermore, will only occur in the measurements of non-uniformity, i.e., $F_{zn}$, $F_{rn}$, $F_{un}$, ...

Determination of the appropriate quantities $H_{zn}$, ... can then be accomplished by analysis of sufficient quantities of tires featuring variance in the quantities $F_{zn}$, $F_{rn}$, $F_{un}$ ... under the assumption that the quantities $H_{zn}$, ... are invariant. Advantageously, according to this invention, the complex quantity transfer functions, H, are determined by a preferred method as follows.

Starting with a quantity $N_2$ of tires of ostensibly identical manufacture (the sample set), Equation (6) consists of $N_2$ separate equations, one such equation for each measured tire. Assuming two low speed input parameters, the following equations are determined (note: the following procedure may be generalized and additional variables may be taken into account):

$$C_{abn} = \frac{\sum_{m=1}^{N_2} F_{anm}F^*_{bnm}}{N_2}, \qquad \text{Equation (14)}$$

where the symbol (*) is the notation for the complex conjugate and a and b take on the following paired combinations:

| a | b |
|---|---|
| x | z |
| x | r |
| z | z |
| z | r |
| r | z |
| r | r | where the n is an integer representing the selected order and m represents the tire number. As described above, for this example, x represents a second speed (i.e., highway speed) force parameter, z denotes a first speed radial force parameter and r denotes a first speed rolling radius parameter. In the above manner $C_{xzn}$, $C_{xzn}$, $C_{zrn}$, $C_{rzn}$ and $C_{rrn}$ are determined.

From the above, it can be shown that complex transfer functions relating the low speed measurements to high speed forces can be determined responsive to:

$$\begin{bmatrix} C_{xzn} \\ C_{xrn} \end{bmatrix} = \begin{bmatrix} C_{zzn} & C_{rzn} \\ C_{zrn} & C_{rrn} \end{bmatrix} \cdot \begin{bmatrix} H_{zn} \\ H_{rn} \end{bmatrix}, \qquad \text{Equation (15)}$$

and more readily responsive to:

$$\begin{bmatrix} H_{zn} \\ H_{rn} \end{bmatrix} = \begin{bmatrix} C_{zzn} & C_{rzn} \\ C_{zrn} & C_{rrn} \end{bmatrix}^{-1} \cdot \begin{bmatrix} C_{xzn} \\ C_{xrn} \end{bmatrix} \qquad \text{Equation (16)}$$

where the indication $(^{-1})$ denotes matrix inverse. The above equation enables the estimation of the 'H' quantities. Those skilled in the art can easily perform the above computations and determinations and incorporate them in a computer based processor, such as processor 118 in FIG. 8.

The 'H' quantities and a limit criteria 116, are transferred from processor 118 to microprocessor-based analyzer 134, which includes microprocessor 136. The limit criteria 116 represents the maximum fore and aft force components for particular orders of rotation at the selected highway speed and can be easily set by one skilled in the art. For example, the limit criteria may be determined by taking sample tires, determining noise vibrations due to fore and aft forces at highway speeds, and setting the limit criteria corresponding to the noise level found unacceptable to the system designer.

Advantageously according to this invention, once the values H are determined, highway speed fore and aft force variation of companion tires can be predicted. "Companion tire" is defined as a tire not included in the original quantity of tires used to derive the quantities H, but manufactured in such a manner as to be ostensibly identical to those tires used for the development of the quantities H, i.e., tires of the same make and model number as the sample tires or manufactured to the same specifications as the sample tires.

According to this invention, after the quantities, H, are determined, highway speed fore and aft force variation predictions can be obtained, requiring only measurements of the low speed quantities.

The foregoing, furthermore, employs as a supporting step a procedure for predicting highway speed fore and aft force variation by transformation of the measurements of the low speed quantities to Fourier series components, followed by operations by complex transfer functions. It is recognized by those skilled in the art that equivalent effects are possible by: (a) transforming the complex transfer functions into a spatial or temporal domain, e.g., angular position of the tire on test drum, $\theta_t$, equivalent distance travelled, linear travel distance of the surface of the test drum, time (in the case of the test drum operated at fixed angular velocity), or other domain related to these recited domains; (b) restricting the effective bandwidth of the low speed measurements, by any number of commonly accepted filtering methods, to those frequencies either spatial or temporal, depending on the selection of domain above, and for which the complex transfer functions, H, are valid, resulting in a band limited measurement; (c) operating on the band limited measurement and the transformed complex transfer functions conjointly, applying accepted techniques known to those skilled in the art; thereby, (d) predicting highway speed fore and aft force variation in the transformed domain.

To those skilled in the art, this latter technique is considered an equivalent operation, albeit in another domain to that set forth in detail herein, and will be recognized by those skilled in the art as an alternative equivalent procedure to accomplish an equivalent result.

Thus, production tires are constructed at block 110 and are placed on a low speed test apparatus 132. Low speed test apparatus 132 rotates the production tires against a drum at a rotational speed, for example in the range of 1 cps, and measures the two selected measurable parameters.

Analyzer 134, then processes the data for each tire resulting from the test apparatus 132 and predicts, for each tire, highway speed fore and aft forces by transforming the data into Fourier series components and substituting the data into equation (6). Thus, responsive to the measurement data and the complex quantity transfer functions, highway speed fore and aft force variations are predicted according to this invention. The programming of analyzer 134 to incorporate equation (6) and to perform the calculations taught herein is easily accomplished by one skilled in the art in view of the information set forth herein.

Figure 13:
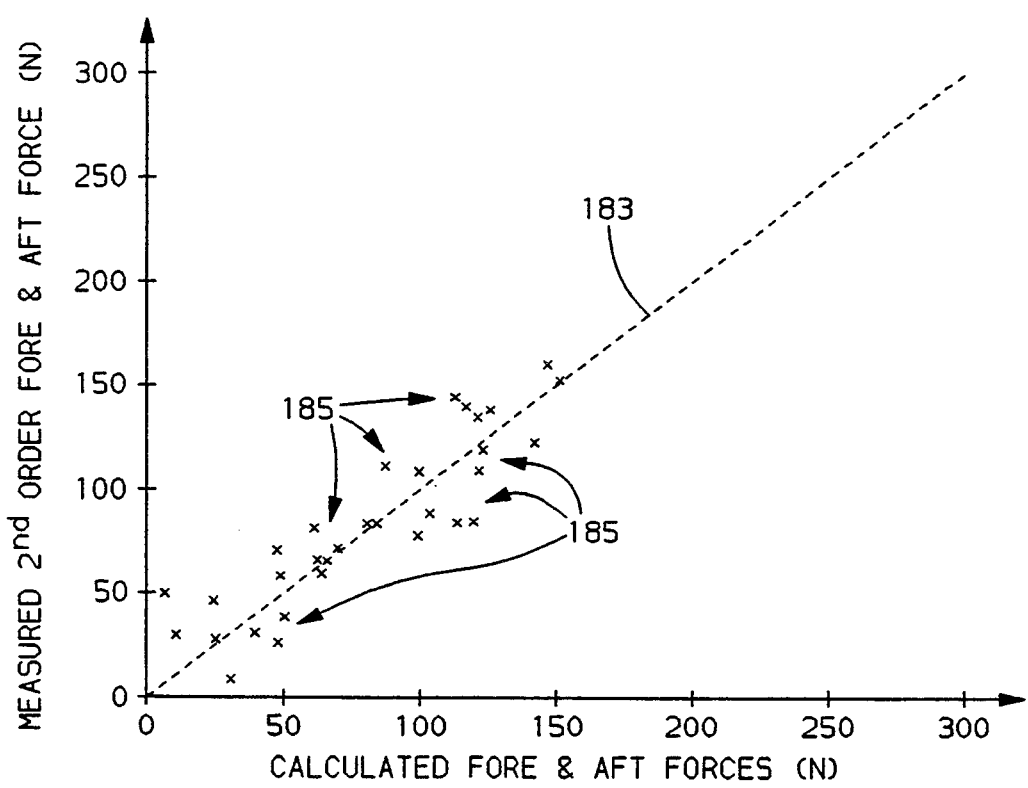
FIG. 13 illustrates a graph of plotted fore and aft force predictions according to this invention and measured fore and aft forces according to this invention.

FIG. 13 illustrates the correlation between example predicted fore and aft force variations according to this invention and actual fore and aft force variation measurements. The degree of correlation shown in FIG. 13 readily illustrates to those skilled in the art the advantages of this invention.

After the force variations are predicted, they are compared to the predetermined limit criteria and, if the tire tested yields predicted force variations that do not fall within the predetermined limit criteria, the corresponding tire is sorted from the remainder of the production tires (block 138) as a rejected tire. The comparison step may be easily performed by analyzer 134 by comparing the magnitude of the predicted force phasors to the predetermined limit criteria, and designating the tires as failed if the predicted magnitudes are greater than the predetermined limit criteria. The sorting may be accomplished by the analyzer 134 controlling a signal light or by displaying on a CRT 135 (or equivalent) or printing on a printer 137 the test results, and then an operator sorting the tires by hand, or by any suitable type of automatic sorter (represented schematically by a pneumatically powered ram or actuator 139 controlled by analyzer 134, that pushes the rejected tire into a bin 141, designated for other uses).

The sorting step may include any known method of sorting, including 100% inspection and representative sampling to determine population statistics (acceptance sampling). In acceptance sampling, a representative portion of the constructed tires are measured and have their highway speed forces predicted according to this invention, with the predictions being used as an indication of the quality of the total number of constructed tires. Any number of sorting techniques based on accepted procedures can be employed responsive to the predictions, quantities derived therefrom, or statistics thereof.

The tires (block 140) that pass the prediction and sorting steps are then assembled onto an automobile 144, most of which has been constructed (block 142) and which may require final assembly (block 146) after the tires are assembled. The resulting automobile 148 according to this invention advantageously includes tires that have been sorted according to the prediction, testing and sorting steps above, thereby providing for the elimination of tires that would otherwise cause excess vibrational noise.

Figure 14:
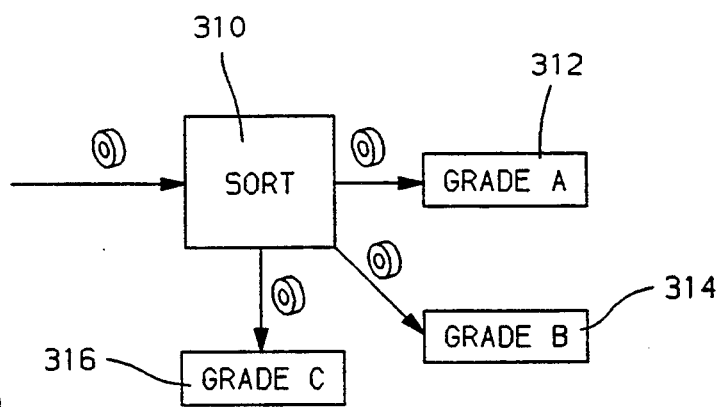
FIG. 14 illustrates an implementation of the method of manufacture according to this invention.

Referring to FIG. 14, the sorting step of this invention may sort (block 310) tires according to several predetermined limit criteria to grade the tires into several grades 312, 314 and 316 of tire. "Grading" a tire is the process of comparing the predicted magnitude of the fore and aft force with that of defined limits, and attributing a level of quality based on this comparison. For example, the analyzer 134 first compares the magnitude of the predicted force phasors to a first predetermined limit criteria. If the predicted magnitudes are less than the first predetermined limit criteria, the tire is graded highest grade 312. Analyzer 134 next compares the predicted magnitudes to a second predetermined limit criteria greater than the first. If the predicted magnitudes that were not less than the first predetermined limit criteria are less than the second predetermined limit criteria, the tire is graded the second highest grade 314. Analyzer 134 next compares the predicted magnitudes to a third predetermined limit criteria greater than the first and second. If the predicted magnitudes that were not less than either the first or second predetermined limit criteria are less than the third limit criteria, the tire is graded the third highest grade 316. The remaining tires are either rejected or graded as the lowest grade.

The actual number of grades is arbitrary and may vary from implementation to implementation.

This method advantageously allows tires to be graded and assembled to vehicles (block 144, FIG. 8) according to the tire grade. For example, the highest quality grade tires can be assembled to vehicles that are more sensitive to noise vibrations caused by force variations at highway speeds.

Additionally, the method of this invention can be used in a tire manufacturing process to test the tire construction (manufacturing) techniques. For example, a sample set of tires is constructed according to the techniques to be tested and low and high speed measurements are taken and complex transfer functions are determined as set forth above. Additional tires are constructed according to the technique to be tested, the tires are rotated at low speeds on a test apparatus and parameter measurements are taken. These parameter measurements and the complex transfer functions are used to predict highway speed fore and aft force variations of the tires. If the predicted highway speed fore and aft force variations of the tires are consistently higher than a predetermined limit, then the tire construction technique is either replaced with a better performing tire construction technique or is altered to improve quality.

Also, statistical process control, controlling the manufacturing process responsive to the comparison, can be used to monitor and improve the quality of a given process.

Note, while the above illustrated embodiment primarily relates to fore and aft force variations of the tire, the method of this invention can advantageously be used to predict highway speed radial and lateral force variations based on low speed measurements in the same manner that fore and aft forces are predicted above.

While the above illustrated example for determining the complex transfer function used for the prediction of the highway speed force variations uses two measured parameters, the above prediction can use more than two measured parameters. When more than two parameters are used, equation (14), above, is computed for all possible combinations of the parameters. Equations (15) and (16) would then include the additional terms. The number of rows of the vectors and matrix will equal the total number of parameters used. The placement of the respective terms, generated by Equation (14) into the resultant vectors and matrices are known to those skilled in the art.

The set of parameters from which two or more measurements may be taken includes: variations in effective rolling radius, radial force variation, geometric runout variation, tread gauge variation of finished tire, variations in angles of internal tire reinforcing materials, that is, steel belts and fabric or steel body plies of the finished tire, variations in geometry, that is, widths and locations of edges and centerline of internal tire reinforcing materials such as steel belts and fabric or steel body plies of the finished tire, tread gauge variation of the tire at intermediate stages of manufacture, variations in angles of internal tire reinforcing materials, that is, steel belts and fabric or steel body plies of the tire at intermediate stages of manufacture, variations in geometry, that is, widths and locations of edges and the centerline of internal tire reinforcing materials such as steel belts and fabric or steel body plies at intermediate stages of manufacture and tire fore and aft force variation.

In general, low speed tire testing described above represents tire testing at a rotation rate corresponding to less than 10 km/h roadway speed and highway speed tire testing represents testing at a rotation rate corresponding to greater than 10 km/h, and typically in excess of 60 km/h.

While the preferred implementation of this invention involves a low first speed of tire rotation and a high second speed of tire rotation, this invention may also be used where the second speed is lower than or equal to the first speed.

Figures 15, 16:
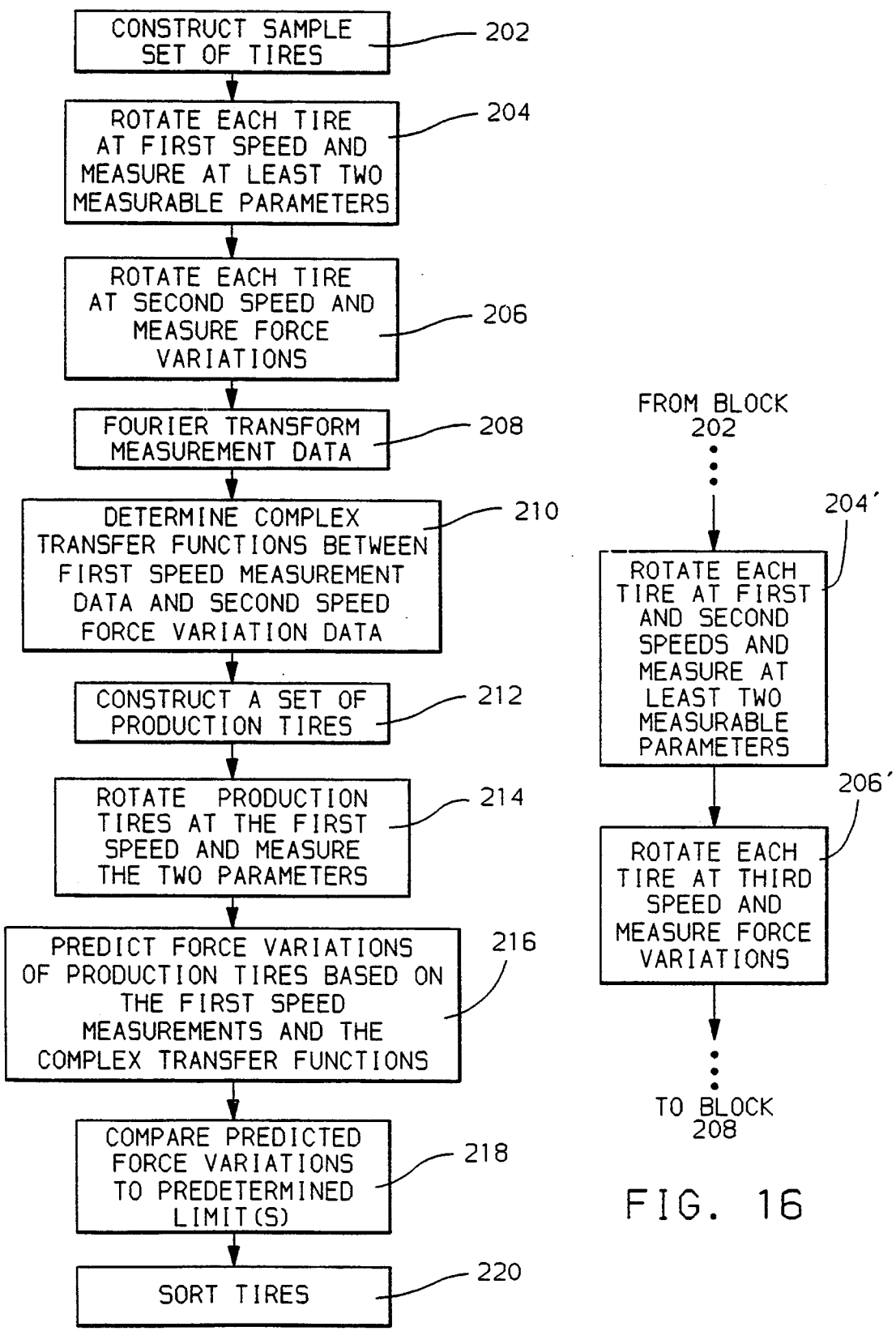
FIGS. 15 and 16 illustrates the method according to this invention.

Referring now to FIGS. 15 and 16, the illustrated method of this invention comprises the steps of: constructing a sample set of tires (block 202); measuring at least two parameters of each tire, for example during a first speed test or during separate low speed tests at the same or different speeds (block 204, 204'); measuring force variations of each tire of the sample set during a second speed test (block 206, 206'); transforming the measurement data into Fourier series components (block 208); determining complex transfer functions between the first speed measurement data and the second speed measurement data (block 210); constructing a set of production tires (block 212); measuring the two parameters of the production tires, for example, during a test at the first speed or during separate low speed tests at the same or different speeds (block 214); predicting force variations of the production tires at the second speed based on the measured two parameters of the production tires obtained from the first speed test and the complex transfer functions (block 216); comparing the predicted highway speed force variations to a predetermined limit (block 218); and sorting out tires whose predicted force variations do not fall within the predetermined limit (block 220).

As described above, in one implementation of this invention, the step of sorting tires is followed by the step of assembling to a vehicle tires whose predicted force variations do fall within the predetermined limit. In practice, this step is typically carried out at a facility remote from that of the tire manufacturer.

Referring again to FIG. 8, the above described example assumes that a single test apparatus 114, 132 can obtain all of the required measurement data. In practice, two or more measurement apparatus 114, 132 may be used to obtain the different parameter measurements.

The above examples employ, as supporting steps, procedures reliant upon transformation of various measurement quantities to Fourier series components, followed by operations on the transformed Fourier series components by complex transfer functions. It is recognized by those skilled in the art, that equivalent effects are possible through operations on the raw measurements without attendant transformation. One such scheme includes: (a) construction of a sample set of tires; (b) for each of the sample tires, obtaining measurements of low and highway speed quantities as functions of $\theta_t$, equivalent distance travelled, linear travel distance of the surface of the test drum, time (in the case of the test drum operated at a fixed angular velocity), or other domain related to these recited domains, (c) restricting the effective bandwidth of the low and highway speed measurements, by any number of commonly accepted filtering methods, to those frequencies, either spatial or temporal, depending on the selection of domain, resulting in a band limited measurement; (d) producing sets of scaled or proportioned highway speed measurements for each of the low speed measurement quantities, the scaling or proportioning being accomplished for each tire of the sample set by (i) multiplying each point of the band limited highway speed measurement quantity by the magnitude of the peak excursion of the respective band limited low speed measurement quantity, (ii) selecting an arbitrary reference point along the band limited low speed measurement waveforms, e.g., at the first positive going zero crossing, at peak excursion, at minimum excursion, at first negative going zero crossing, as examples of readily identifiable reference points, the select reference point being common for all operations thereafter, (iii) determining, along the domain variable, measures of the difference between the initial sampling reference data to the select reference points of the respective band limited low speed measurement quantities; (e) offsetting or displacing, in the negative direction of the domain variable, the scaled, band limited highway speed measurement quantities for the respective low speed measurements, by the recorded measures of ((d)(iii)); (f) for each of the respective sets of scaled or proportioned highway speed measurements, summing the scaled, offset measurements, in a manner such that the first point of the resultant summations corresponding to the low speed measurements are the sums of the first points of each of the respective offset, scaled measurements, the second point of the resultant summations are the sums of the second points of each of the respective offset, scaled measurements, etc., thereby accomplishing summation over the individual tires of the sample set, producing derived quantities of measurements; (g) dividing each point of the derived quantities of measurements by the sum, over the tires of the sample set, of the squares of the peak excursions of the respective low speed measurements to obtain normalized component predictions of the respective low speed measurements, thereby arriving at the transfer functions in the measurement domain; (h) constructing at least one production tire; (i) acquiring measurements of the low speed quantities of the production tire; (j) restricting the effective bandwidth of the low speed measurements of the production tire consistent with the effective bandwidth of the sample tire measurements resulting in band limited low speed measurements, thereby extracting data corresponding to a selected order of tire rotation; (k) creating predicted highway speed component measurement quantities of the scaled or proportioned normalized component predictions (from step (g)) for each of the low speed measurement quantities by multiplying each point of the respective normalized component prediction by the magnitude of the respective peak excursion of the respective band limited production tire low speed measurement quantity; (1) determining the measures along the domain variable of the amounts from initial sampling reference data to the selected reference points of the respective band limited low speed measurement quantities; (m) offsetting, in the positive direction of the domain variable, the predicted component measurement quantities, by the determined measures; and (n) creating a resultant predicted highway speed measurement quantity by summing the predicted component measurement quantities on a point by point basis, i.e., the first point of the predicted highway speed measurement quantity being the sum of the first points of the offset predicted component measurement quantities, the second point of the predicted highway speed measurement quantity being the sum of the second points of the offset predicted component measurement quantities, etc.

The above steps achieve predicted quantities, similar to those described in the preceding examples, with the additional requirement that the low speed measurement quantities of the sample set of tires are mutually incoherent, i.e., uncorrelated. Such operations are readily recognized, by those skilled in the art, as equivalent to those described in the preceding developments.

The above described implementations of this invention are example implementations. Moreover, various improvements and modifications to this invention may occur to those skilled in the an and will fall within the scope of this invention as set forth below.

The embodiments of the invention in which an exclusive property or privilege is claimed are defined as follows:

1. A method of manufacturing tires, comprising the steps of:
    (a) constructing a sample set of tires;
    (b) selecting first and second measurable parameters from a set comprising: variation in effective rolling radius; radial force variation; geometric runout variation; and fore and aft force variation;
    (c) measuring the selected first and second measurable parameters of at least one tire of the sample set to obtain first and second measurement data;
    (d) rotating the one tire at a prediction speed on a measurement apparatus;
    (e) measuring at least one parameter indicative of force variations of the one tire during the rotation at the prediction speed to obtain force variation measurement data;
    (f) repeating steps (c)–(e) for remaining tires in the sample set; (g) extracting, from the first and second measurement data and the force variation measurement data for each sample tire, data corresponding to a selected order of tire rotation;
    (h) responsive to the extracted data, determining transfer functions relating the first and second measurement data to the force variation measurement data;
    (i) constructing at least one production tire;
    (j) repeating step (c) on the one production tire to obtain first and second production measurement data for the one production tire;
    (k) predicting a force for rotation of the one production tire at the prediction speed responsive to the first and second production measurement data and the transfer functions;
    (l) responsive to the predicted force, comparing the one tire to a predetermined criteria; and
    (m) controlling the tire manufacture responsive to the comparison.

2. The method of claim 1, wherein step (g) includes: determining Fourier series components of at least one order of tire rotation for the first and second measurement data; and determining Fourier series components of at least one order of tire rotation for the force variation measurement data.

3. The method of claim 1, wherein step (m) includes sorting construction tires responsive to the comparison.

4. The method of claim 1, additionally comprising the step of repeating steps (g)–(m) for additional orders of tire rotation.

5. The method of claim 1, also comprising the step of: using the extracted data, determining a set of complex quantities: $C_{xzn}$, $C_{xrn}$, $C_{zzn}$, $C_{zrn}$, $C_{rzn}$ and $C_{rrn}$, according to an equation:

$$C_{abn} = \frac{\sum_{m=1}^{N_2} F_{anm} F^*_{bnm}}{N_2}$$

where F represents the extracted data, (*) denotes the complex conjugate, $N_2$ denotes a number of tires in the sample set and a and b take on the following paired combinations:

| a | b |
|---|---|
| x | z |
| x | r |
| z | z |
| z | r |
| r | z |
| r | r | where n represents the selected order, m designates a particular tire, x denotes force variation measurement data, r denotes first measurement data and z denotes second measurement data, wherein step (j) determines the transfer functions responsive to:

$$\begin{bmatrix} C_{xzn} \\ C_{xrn} \end{bmatrix} = \begin{bmatrix} C_{zzn} & C_{rzn} \\ C_{zrn} & C_{rrn} \end{bmatrix} \cdot \begin{bmatrix} H_{zn} \\ H_{rn} \end{bmatrix},$$

where $H_{zn}$ and $H_{rn}$ comprise the transfer functions.

6. The method of claim 5, wherein step (k) predicts the force according to:

$$F_{xn} = H_{zn} F_{zn} + H_{rn} F_{rn}.$$

7. The method of claim 1, also comprising the step of: using the extracted data, determining a set of complex quantities: $C_{xzn}$, $C_{xrn}$, $C_{zzn}$, $C_{zrn}$, $C_{rzn}$ and $C_{rrn}$ according to an equation $$C_{abn} = \frac{\sum_{m=1}^{N_2} F_{anm} F^*_{bnm}}{N_2}$$

where F represents the extracted data, (*) denotes the complex conjugate, $N_2$ is a number of tires in the sample set and a and b take on the following paired combinations:

| a | b |
|---|---|
| x | z |
| x | r |
| z | z |
| z | r |

-continued

| a | b |
|---|---|
| r | z |
| r | r | where n represents the selected order, m designates a particular tire, x denotes force variation measurement data, r denotes first measurement data and z denotes second measurement data, wherein step (h) determines the transfer functions responsive to:

$$\begin{bmatrix} H_{zn} \\ H_{rn} \end{bmatrix} = \begin{bmatrix} C_{zzn} & C_{rzn} \\ C_{zrn} & C_{rrn} \end{bmatrix}^{-1} \cdot \begin{bmatrix} C_{xzn} \\ C_{xrn} \end{bmatrix},$$

where $H_{zn}$ and $H_{rn}$ comprise the transfer functions.

8. The method of claim 7, wherein step (k) predicts the force according to:

$$F_{xn} = H_{zn} F_{zn} + H_{rn} F_{rn}.$$

9. A method of manufacturing tires, comprising the steps of:
  (a) constructing a sample set of tires;
  (b) selecting first and second measurable parameters from a set comprising: variation in effective rolling radius; radial force variation; geometric runout variation; and fore and aft force variation;
  (c) rotating one tire of the sample set at a first speed rotational rate on a measurement apparatus;
  (d) measuring the selected first and second measurable parameters for the one tire during the rotation at the first speed to obtain first and second measurement data;
  (e) rotating the one tire at a second speed on the measurement apparatus;
  (f) measuring at least one parameter indicative of force variations of the one tire during the rotation at the second speed to obtain force variation measurement data;
  (g) determining Fourier series components of at least one order of tire rotation for the first and second measurement data;
  (h) determining Fourier series components of at least one order of tire rotation for the force variation measurement data;
  (i) repeating steps (c)–(h) for the remaining tires in the sample set;
  (j) extracting, from the first and second measurement data and the force variation measurement data for each sample tire, data corresponding to a select order of tire rotation;
  (k) using the extracted data, determining a set of complex quantities: $C_{xzn}$, $C_{xrn}$, $C_{zzn}$, $C_{zrn}$, $C_{rzn}$ and $C_{rrn}$ according to an equation $$C_{abn} = \frac{\sum_{m=1}^{N_2} F_{anm} F^*_{bnm}}{N_2}$$

where F represents the extracted data, (*) denotes the complex conjugate, $N_2$ denotes a number of tires in the sample set and a and b take on the following paired combinations:

| a | b |
|---|---|
| x | z |
| x | r |
| z | z |
| z | r |
| r | z |
| r | r | where n represents the selected order, m designates a particular tire, x denotes force variation measurement data, r denotes first speed first measurement data and z denotes first speed second measurement data;

(l) responsive to:

$$\begin{bmatrix} C_{xzn} \\ C_{xrn} \end{bmatrix} = \begin{bmatrix} C_{zzn} & C_{rzn} \\ C_{zrn} & C_{rrn} \end{bmatrix} \cdot \begin{bmatrix} H_{zn} \\ H_{rn} \end{bmatrix},$$

determining transfer functions $H_{zn}$ and $H_{rn}$ relating the first and second measurement data to the force variation measurement data;

(m) constructing at least one production tire;

(n) repeating steps (c) and (d) on the one production tire to obtain first and second production measurement data for the one production tire;

(o) predicting a force for rotation of the one production tire at the second speed responsive to the first and second production measurement data and the transfer function;

(p) comparing the predicted force to a predetermined limit; and (q) sorting construction tires with predicted forces that do not fall within the predetermined limit.

10. The method of claim 9, additionally comprising the step of repeating steps (j)–(q) for additional orders of tire rotation.

11. The method of claim 9, wherein the step (o) also comprises repeating step (g) on the one production tire.

12. The method of claim 9, wherein step (o) predicts the force according to:

$$F_{xn} = H_{zn} F_{zn} + H_{rn} F_{rn}.$$

13. The method of claim 9, wherein
step (l) determines the transfer functions responsive to:

$$\begin{bmatrix} H_{zn} \\ H_{rn} \end{bmatrix} = \begin{bmatrix} C_{zzn} & C_{rzn} \\ C_{zrn} & C_{rrn} \end{bmatrix}^{-1} \cdot \begin{bmatrix} C_{xzn} \\ C_{xrn} \end{bmatrix},$$

where $H_{zn}$ and $H_{rn}$ comprise the transfer functions.

14. The method of claim 13, wherein (o) predicts the force according to:

$$F_{xn} = H_{zn} F_{zn} + H_{rn} F_{rn}.$$

15. A method of manufacturing tires, comprising the steps of:

(a) constructing a sample set of tires;

(b) selecting first and second measurable parameters from a set comprising: variation in effective rolling radius; radial force variation; geometric runout variation; and fore and aft force variation (c) rotating one tire of the sample set at a first rotational rate on a first measurement apparatus;

(d) measuring the selected first measurable parameter for the one tire during the rotation at the first rotational rate to obtain first measurement data;

(e) rotating the one tire of the sample set at a second rotation rate on one of: (a) the first measurement apparatus and (b) a second measurement apparatus, wherein the second rotational rate is one of: a rate greater than the first rotational rate; a rate equal to the first rotational rate; and a rate less than the first rotational rate;

(f) measuring the selected second measurable parameter for the one tire during the rotation at the second rotational rate to obtain second measurement data;

(g) rotating the one tire at a third speed on one of: (i) the first measurement apparatus, (ii) the second measurement apparatus and (iii) a third measurement apparatus, wherein the third rotational rate is one of: a rate equal to the first rotational rate; a rate equal to the second rotational rate; and a rate not equal to either the first or second rotational rates;

(h) measuring at least one parameter indicative of force variations of the one tire during the rotation at the third rotational rate to obtain force variation measurement data;

(i) repeating steps (c)–(h) for the remaining tires in the sample set;

(j) extracting, from the first and second measurement data and the force variation measurement data for each sample tire, data corresponding to a selected order of tire rotation;

(k) responsive to the extracted data, determining transfer functions relating the first and second measurement data to the force variation measurement data;

(l) constructing at least one production tire;

(m) repeating steps (c), (d), (e) and (f) on the one production tire to obtain first and second production measurement data for the one production tire;

(n) predicting a force for rotation of the one production tire at the third speed responsive to the first and second production measurement data and the transfer functions;

(o) responsive to the predicted force, comparing the one tire to a predetermined criteria; and (p) controlling the tire manufacture responsive to the comparison.

16. The method of claim 15 wherein step (p) includes sorting construction tires responsive to the comparison.

17. The method of claim 15, wherein step (j) includes:
determining Fourier series components of at least one order of tire rotation for the first and second measurement data; and
determining Fourier series components of at least one order of tire rotation for the force variation measurement data.

18. The method of claim 15, additionally comprising the step of repeating steps (j)–(p) for additional orders of tire rotation.

19. The method of claim 15, also comprising the step of determining Fourier series components of at least one order of tire rotation for the first and second production measurement data.

20. The method of claim 15, also comprising the step of:

using the extracted data, determining a set of complex quantities: $C_{xzn}$, $C_{xrn}$, $C_{zzn}$, $C_{zrn}$, $C_{rzn}$ and $C_{rrn}$, according to an equation:

$$C_{abn} = \frac{\sum_{m=1}^{N_2} F_{anm}F^*_{bnm}}{N_2}$$

where F represents the extracted data, (*) denotes the complex conjugate, $N_2$ denotes a number of tires in the sample set and a and b take on the following paired combinations:

| a | b |
|---|---|
| x | z |
| x | r |
| z | z |
| z | r |
| r | z |
| r | r | where n represents the selected order, m designates a particular tire, x denotes force variation measurement data, r denotes first measurement data and z denotes second measurement data, wherein step (k) determines the transfer functions responsive to:

$$\begin{bmatrix} C_{xzn} \\ C_{xrn} \end{bmatrix} = \begin{bmatrix} C_{zzn} & C_{rzn} \\ C_{zrn} & C_{rrn} \end{bmatrix} \cdot \begin{bmatrix} H_{zn} \\ H_{rn} \end{bmatrix},$$

where $H_{zn}$ and $H_{rn}$ comprise the transfer functions.

21. The method of claim 20, wherein step (n) predicts the force according to:

$$F_{xn} = H_{zn}F_{zn} + H_{rn}F_{rn}.$$

22. The method of claim 15, also comprising the step of:

using the extracted data, determining a set of complex quantities: $C_{xzn}$, $C_{xrn}$, $C_{zzn}$, $C_{zrn}$, $C_{rzn}$ and $C_{rrn}$ according to an equation $$C_{abn} = \frac{\sum_{m=1}^{N_2} F_{anm}F^*_{bnm}}{N_2}$$

where F represents the extracted data, (*) denotes the complex conjugate, $N_2$ is a number of tires in the sample set and a and b take on the following paired combinations:

| a | b |
|---|---|
| x | z |
| x | r |
| z | z |
| z | r |
| r | z |
| r | r | where n represents the selected order, m designates a particular tire, x denotes force variation measurement data, r denotes first measurement data and z denotes second measurement data, wherein step (k) determines the transfer functions responsive to:

$$\begin{bmatrix} H_{zn} \\ H_{rn} \end{bmatrix} = \begin{bmatrix} C_{zzn} & C_{rzn} \\ C_{zrn} & C_{rrn} \end{bmatrix}^{-1} \cdot \begin{bmatrix} C_{xzn} \\ C_{xrn} \end{bmatrix},$$

where $H_{zn}$ and $H_{rn}$ comprise the transfer functions.

23. The method of claim 22, wherein step (n) predicts the force according to:

$$F_{xn} = H_{zn}F_{zn} + H_{rn}F_{rn}.$$

24. A method of manufacturing tires comprising the steps of: constructing a sample set of tires; measuring at least two parameters of each tire of the sample to obtain first and second measurement data; measuring force variations of each tire of the sample set during a rotation test at a select rotation rate to obtain force variation data; determining transfer functions between the first and second measurement data and the force variation data; constructing a set of production tires; measuring the two parameters of the production tires; predicting force variations of the production tires at the select rotation rate based on the transfer functions and the two measured parameters of the production tires; responsive to the predicted force variations, comparing the production tires to predetermined criteria; and controlling manufacture of the tires responsive to the comparison.

* * * * *